(12) United States Patent
Kato et al.

(10) Patent No.: US 7,967,216 B2
(45) Date of Patent: Jun. 28, 2011

(54) WIRELESS IC DEVICE

(75) Inventors: Noboru Kato, Moriyama (JP); Jun Sasaki, Kyoto (JP); Satoshi Ishino, Kusatsu (JP); Katsumi Taniguchi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/902,174

(22) Filed: Oct. 12, 2010

(65) Prior Publication Data

US 2011/0024510 A1 Feb. 3, 2011

Related U.S. Application Data

(63) Continuation of application No. PCT/JP2009/059410, filed on May 22, 2009.

(30) Foreign Application Priority Data

May 22, 2008 (JP) .................................. 2008-133829

(51) Int. Cl.
*G06K 19/06* (2006.01)
(52) U.S. Cl. ...................................................... 235/492
(58) Field of Classification Search .................. 235/492; 343/701–823
See application file for complete search history.

(56) References Cited

U.S. PATENT DOCUMENTS

| | | | |
|---|---|---|---|
| 3,364,564 A | 1/1968 | Kurtz et al. | |
| 4,794,397 A | 12/1988 | Ohe et al. | |
| 5,232,765 A | 8/1993 | Yano et al. | |
| 5,253,969 A | 10/1993 | Richert | |
| 5,337,063 A | 8/1994 | Takahira | |
| 5,374,937 A | 12/1994 | Tsunekawa et al. | |
| 5,399,060 A | 3/1995 | Richert | |
| 5,491,483 A | 2/1996 | D'Hont | |
| 5,528,222 A | 6/1996 | Moskowitz et al. | |
| 5,757,074 A | 5/1998 | Matloubian et al. | |
| 5,854,480 A | 12/1998 | Noto | |

(Continued)

FOREIGN PATENT DOCUMENTS

DE 10 2006 057 369 A1 6/2008

(Continued)

OTHER PUBLICATIONS

Dokai et al.: "Wireless IC Device and Component for Wireless IC Device"; U.S. Appl. No. 11/624,382, filed Jan. 18, 2007.

(Continued)

*Primary Examiner* — Thien M. Le
*Assistant Examiner* — Christle I Marshall
(74) *Attorney, Agent, or Firm* — Keating & Bennett, LLP

(57) ABSTRACT

A wireless IC device prevents deviations of the resonant frequency from the desired value. An antenna coil has an end portion positioned in a connector provided on the negative-most side in the z-axis direction and an end portion positioned in a connector provided on the positive-most side in the z-axis direction. A wireless IC is electrically connected to the end portions. A via hole conductor is provided between the end portion and the wireless IC and penetrates through a plurality of insulator layers. A via hole conductor is provided in the antenna coil such that the length of a current path thereto from the end portion is the shortest among a plurality of via hole conductors. The distance between the via hole conductor and the via hole conductor is larger than the distances between the penetrating via hole conductor and the via hole conductors.

8 Claims, 13 Drawing Sheets

U.S. PATENT DOCUMENTS

| | | | |
|---|---|---|---|
| 5,903,239 | A | 5/1999 | Takahashi et al. |
| 5,936,150 | A | 8/1999 | Kobrin et al. |
| 5,955,723 | A | 9/1999 | Reiner |
| 5,995,006 | A | 11/1999 | Walsh |
| 6,104,311 | A | 8/2000 | Lastinger |
| 6,107,920 | A | 8/2000 | Eberhardt et al. |
| 6,172,608 | B1 | 1/2001 | Cole |
| 6,181,287 | B1 | 1/2001 | Beigel |
| 6,190,942 | B1 | 2/2001 | Wilm et al. |
| 6,249,258 | B1 | 6/2001 | Bloch et al. |
| 6,259,369 | B1 | 7/2001 | Monico |
| 6,271,803 | B1 | 8/2001 | Watanabe et al. |
| 6,335,686 | B1 | 1/2002 | Goff et al. |
| 6,362,784 | B1 | 3/2002 | Kane et al. |
| 6,367,143 | B1 | 4/2002 | Sugimura |
| 6,378,774 | B1 | 4/2002 | Emori et al. |
| 6,406,990 | B1 | 6/2002 | Kawai |
| 6,448,874 | B1 | 9/2002 | Shiino et al. |
| 6,462,716 | B1 | 10/2002 | Kushihi |
| 6,542,050 | B1 | 4/2003 | Arai et al. |
| 6,600,459 | B2 | 7/2003 | Yokoshima et al. |
| 6,634,564 | B2 | 10/2003 | Kuramochi |
| 6,664,645 | B2 | 12/2003 | Kawai |
| 6,763,254 | B2 | 7/2004 | Nishikawa |
| 6,812,707 | B2 | 11/2004 | Yonezawa et al. |
| 6,828,881 | B2 | 12/2004 | Mizutani et al. |
| 6,837,438 | B1 | 1/2005 | Takasugi et al. |
| 6,861,731 | B2 | 3/2005 | Buijsman et al. |
| 6,927,738 | B2 | 8/2005 | Senba et al. |
| 6,963,729 | B2 | 11/2005 | Uozumi |
| 7,088,249 | B2 | 8/2006 | Senba et al. |
| 7,088,307 | B2 | 8/2006 | Imaizumi |
| 7,112,952 | B2 | 9/2006 | Arai et al. |
| 7,119,693 | B1 | 10/2006 | Devilbiss |
| 7,129,834 | B2 | 10/2006 | Naruse et al. |
| 7,248,221 | B2 | 7/2007 | Kai et al. |
| 7,250,910 | B2 | 7/2007 | Yoshikawa et al. |
| 7,276,929 | B2 | 10/2007 | Arai et al. |
| 7,317,396 | B2 | 1/2008 | Ujino |
| 7,405,664 | B2 | 7/2008 | Sakama et al. |
| 2002/0011967 | A1 | 1/2002 | Goff et al. |
| 2002/0015002 | A1 | 2/2002 | Yasukawa et al. |
| 2002/0044092 | A1 | 4/2002 | Kushihi |
| 2002/0067316 | A1 | 6/2002 | Yokoshima et al. |
| 2002/0093457 | A1 | 7/2002 | Hamada et al. |
| 2003/0006901 | A1 | 1/2003 | Kim et al. |
| 2003/0020661 | A1 | 1/2003 | Sato |
| 2003/0045324 | A1 | 3/2003 | Nagumo et al. |
| 2003/0169153 | A1 | 9/2003 | Muller |
| 2004/0001027 | A1 | 1/2004 | Killen et al. |
| 2004/0026519 | A1 | 2/2004 | Usami et al. |
| 2004/0056823 | A1 | 3/2004 | Zuk et al. |
| 2004/0066617 | A1 | 4/2004 | Hirabayashi et al. |
| 2004/0217915 | A1 | 11/2004 | Imaizumi |
| 2004/0219956 | A1 | 11/2004 | Iwai et al. |
| 2004/0227673 | A1 | 11/2004 | Iwai et al. |
| 2004/0252064 | A1 | 12/2004 | Yuanzhu |
| 2005/0092836 | A1 | 5/2005 | Kudo |
| 2005/0099337 | A1 | 5/2005 | Takei et al. |
| 2005/0125093 | A1 | 6/2005 | Kikuchi et al. |
| 2005/0134460 | A1 | 6/2005 | Usami |
| 2005/0134506 | A1 | 6/2005 | Egbert |
| 2005/0138798 | A1 | 6/2005 | Sakama et al. |
| 2005/0140512 | A1 | 6/2005 | Sakama et al. |
| 2005/0232412 | A1 | 10/2005 | Ichihara et al. |
| 2005/0236623 | A1 | 10/2005 | Takechi et al. |
| 2005/0275539 | A1 | 12/2005 | Sakama et al. |
| 2006/0001138 | A1 | 1/2006 | Sakama et al. |
| 2006/0044192 | A1 | 3/2006 | Egbert |
| 2006/0055601 | A1 | 3/2006 | Kameda et al. |
| 2006/0071084 | A1 | 4/2006 | Detig et al. |
| 2006/0109185 | A1 | 5/2006 | Iwai et al. |
| 2006/0145872 | A1 | 7/2006 | Tanaka et al. |
| 2006/0158380 | A1 | 7/2006 | Son et al. |
| 2006/0170606 | A1 | 8/2006 | Yamagajo et al. |
| 2006/0214801 | A1 | 9/2006 | Murofushi et al. |
| 2006/0220871 | A1 | 10/2006 | Baba et al. |
| 2006/0244676 | A1 | 11/2006 | Uesaka |
| 2006/0267138 | A1 | 11/2006 | Kobayashi |
| 2007/0004028 | A1 | 1/2007 | Lair et al. |
| 2007/0018893 | A1 | 1/2007 | Kai et al. |
| 2007/0040028 | A1 | 2/2007 | Kawamata |
| 2007/0052613 | A1 | 3/2007 | Gallschuetz et al. |
| 2007/0057854 | A1 | 3/2007 | Oodachi et al. |
| 2007/0069037 | A1 | 3/2007 | Kawai |
| 2007/0132591 | A1 | 6/2007 | Khatri |
| 2007/0164414 | A1 | 7/2007 | Dokai et al. |
| 2007/0200782 | A1 | 8/2007 | Hayama et al. |
| 2007/0252700 | A1 | 11/2007 | Ishihara et al. |
| 2007/0252703 | A1 | 11/2007 | Kato et al. |
| 2007/0285335 | A1 | 12/2007 | Bungo et al. |
| 2007/0290928 | A1 | 12/2007 | Chang et al. |
| 2008/0024156 | A1 | 1/2008 | Arai et al. |
| 2008/0087990 | A1 | 4/2008 | Kato et al. |
| 2008/0169905 | A1 | 7/2008 | Slatter |
| 2008/0272885 | A1 | 11/2008 | Atherton |
| 2009/0002130 | A1 | 1/2009 | Kato |
| 2009/0009007 | A1 | 1/2009 | Kato et al. |
| 2009/0065594 | A1 | 3/2009 | Kato et al. |
| 2009/0109102 | A1 | 4/2009 | Dokai et al. |
| 2009/0160719 | A1* | 6/2009 | Kato et al. ............ 343/742 |
| 2009/0231106 | A1 | 9/2009 | Okamura |
| 2009/0262041 | A1 | 10/2009 | Ikemoto et al. |
| 2009/0266900 | A1* | 10/2009 | Ikemoto et al. .......... 235/492 |

FOREIGN PATENT DOCUMENTS

| | | |
|---|---|---|
| EP | 0 694 874 A2 | 1/1996 |
| EP | 0 977 145 A2 | 2/2000 |
| EP | 1 010 543 A1 | 6/2000 |
| EP | 1 160 915 A2 | 12/2001 |
| EP | 1 170 795 A2 | 1/2002 |
| EP | 1 227 540 A1 | 7/2002 |
| EP | 1 280 232 A1 | 1/2003 |
| EP | 1 280 350 A1 | 1/2003 |
| EP | 1 343 223 A1 | 9/2003 |
| EP | 1 357 511 A2 | 10/2003 |
| EP | 1 548 872 A1 | 6/2005 |
| EP | 1 703 589 A1 | 9/2006 |
| EP | 1 841 005 A1 | 10/2007 |
| EP | 2 009 738 A1 | 12/2008 |
| EP | 2 148 449 A1 | 1/2010 |
| GB | 2 305 075 A | 3/1997 |
| JP | 50-143451 A | 11/1975 |
| JP | 62-127140 U | 8/1987 |
| JP | 02-164105 A | 6/1990 |
| JP | 03-262313 A | 11/1991 |
| JP | 04-150011 A | 5/1992 |
| JP | 04-167500 A | 6/1992 |
| JP | 05-327331 A | 12/1993 |
| JP | 6-53733 A | 2/1994 |
| JP | 06-077729 A | 3/1994 |
| JP | 06-177635 A | 6/1994 |
| JP | 6-260949 A | 9/1994 |
| JP | 07-183836 A | 7/1995 |
| JP | 08-056113 A | 2/1996 |
| JP | 8-87580 A | 4/1996 |
| JP | 08-088586 A | 4/1996 |
| JP | 11-149537 A | 6/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 9-93029 A | 4/1997 |
| JP | 09-245381 A | 9/1997 |
| JP | 09-252217 A | 9/1997 |
| JP | 09-270623 A | 10/1997 |
| JP | 9-512367 A | 12/1997 |
| JP | 10-069533 A | 3/1998 |
| JP | 10-69533 A | 3/1998 |
| JP | 10-505466 A | 5/1998 |
| JP | 10-171954 A | 6/1998 |
| JP | 10-193849 A | 7/1998 |
| JP | 10-193851 A | 7/1998 |
| JP | 10-293828 A | 11/1998 |

| | | | | | | | |
|---|---|---|---|---|---|---|---|
| JP | 11-039441 | A | 2/1999 | JP | 2002-280821 | A | 9/2002 |
| JP | 11-075329 | A | 3/1999 | JP | 2002-298109 | A | 10/2002 |
| JP | 11-085937 | A | 3/1999 | JP | 2002-308437 | A | 10/2002 |
| JP | 11-88241 | A | 3/1999 | JP | 2002-319008 | A | 10/2002 |
| JP | 11-102424 | A | 4/1999 | JP | 2002-319009 | A | 10/2002 |
| JP | 11-103209 | A | 4/1999 | JP | 2002-319812 | A | 10/2002 |
| JP | 11-149536 | A | 6/1999 | JP | 2002-362613 | A | 12/2002 |
| JP | 11-149538 | A | 6/1999 | JP | 2002-373029 | A | 12/2002 |
| JP | 11-219420 | A | 8/1999 | JP | 2002-373323 | A | 12/2002 |
| JP | 11-220319 | A | 8/1999 | JP | 2002-374139 | A | 12/2002 |
| JP | 11-328352 | A | 11/1999 | JP | 2003-006599 | A | 1/2003 |
| JP | 11-346114 | A | 12/1999 | JP | 2003-016412 | A | 1/2003 |
| JP | 11-515094 | A | 12/1999 | JP | 2003-026177 | A | 1/2003 |
| JP | 2000-21128 | A | 1/2000 | JP | 2003-030612 | A | 1/2003 |
| JP | 2000-021639 | A | 1/2000 | JP | 2003-44789 | A | 2/2003 |
| JP | 2000-022421 | A | 1/2000 | JP | 2003-046318 | A | 2/2003 |
| JP | 2005-229474 | A | 1/2000 | JP | 2003-58840 | A | 2/2003 |
| JP | 2000-059260 | A | 2/2000 | JP | 2003-067711 | A | 3/2003 |
| JP | 2000-085283 | A | 3/2000 | JP | 2003-069335 | A | 3/2003 |
| JP | 2000-090207 | A | 3/2000 | JP | 2003-076947 | A | 3/2003 |
| JP | 2000-132643 | A | 5/2000 | JP | 2003-76963 | A | 3/2003 |
| JP | 2000-137778 | A | 5/2000 | JP | 2003-78333 | A | 3/2003 |
| JP | 2000-137779 | A | 5/2000 | JP | 2003-078336 | A | 3/2003 |
| JP | 2000-137785 | A | 5/2000 | JP | 2003-085501 | A | 3/2003 |
| JP | 2000-148948 | A | 5/2000 | JP | 2003-085520 | A | 3/2003 |
| JP | 2000-172812 | A | 6/2000 | JP | 2003-87008 | A | 3/2003 |
| JP | 2000-209013 | A | 7/2000 | JP | 2003-87044 | A | 3/2003 |
| JP | 2000-222540 | A | 8/2000 | JP | 2003-099720 | A | 4/2003 |
| JP | 2000-510271 | A | 8/2000 | JP | 2003-099721 | A | 4/2003 |
| JP | 2000-242754 | A | 9/2000 | JP | 2003-110344 | A | 4/2003 |
| JP | 2000-243797 | A | 9/2000 | JP | 2003-132330 | A | 5/2003 |
| JP | 2000-251049 | A | 9/2000 | JP | 2003-134007 | A | 5/2003 |
| JP | 2000-276569 | A | 10/2000 | JP | 2003-155062 | A | 5/2003 |
| JP | 2000-286634 | A | 10/2000 | JP | 2003-158414 | A | 5/2003 |
| JP | 2000-286760 | A | 10/2000 | JP | 2003-168760 | A | 6/2003 |
| JP | 2000-311226 | A | 11/2000 | JP | 2003-179565 | A | 6/2003 |
| JP | 2000-321984 | A | 11/2000 | JP | 2003-187207 | A | 7/2003 |
| JP | 3075400 | U | 11/2000 | JP | 2003-187211 | A | 7/2003 |
| JP | 2000-349680 | A | 12/2000 | JP | 2003-188338 | A | 7/2003 |
| JP | 2001-10264 | A | 1/2001 | JP | 2003-188620 | A | 7/2003 |
| JP | 2001-028036 | A | 1/2001 | JP | 2003-198230 | A | 7/2003 |
| JP | 2007-18067 | A | 1/2001 | JP | 2003-209421 | A | 7/2003 |
| JP | 2001-043340 | A | 2/2001 | JP | 2003-216919 | A | 7/2003 |
| JP | 2001-66990 | A | 3/2001 | JP | 2003-218624 | A | 7/2003 |
| JP | 2001-76111 | A | 3/2001 | JP | 2003-233780 | A | 8/2003 |
| JP | 2001-505682 | A | 4/2001 | JP | 2003-242471 | A | 8/2003 |
| JP | 2001-168628 | A | 6/2001 | JP | 2003-243918 | A | 8/2003 |
| JP | 2001-188890 | A | 7/2001 | JP | 2003-249813 | A | 9/2003 |
| JP | 2001-240046 | A | 9/2001 | JP | 2003-529163 | A | 9/2003 |
| JP | 2001-256457 | A | 9/2001 | JP | 2003-288560 | A | 10/2003 |
| JP | 2001-257292 | A | 9/2001 | JP | 2003-309418 | A | 10/2003 |
| JP | 2001-514777 | A | 9/2001 | JP | 2003-317060 | A | 11/2003 |
| JP | 2001-319380 | A | 11/2001 | JP | 2003-331246 | A | 11/2003 |
| JP | 2001-331976 | A | 11/2001 | JP | 2003-332820 | A | 11/2003 |
| JP | 2001-332923 | A | 11/2001 | JP | 2003-536302 | A | 12/2003 |
| JP | 2001-339226 | A | 12/2001 | JP | 2004-040597 | A | 2/2004 |
| JP | 2001-344574 | A | 12/2001 | JP | 2004-505481 | A | 2/2004 |
| JP | 2001-351084 | A | 12/2001 | JP | 2004-082775 | A | 3/2004 |
| JP | 2001-352176 | A | 12/2001 | JP | 2004-88218 | A | 3/2004 |
| JP | 2002-024776 | A | 1/2002 | JP | 2004-93693 | A | 3/2004 |
| JP | 2002-026513 | A | 1/2002 | JP | 2004-096566 | A | 3/2004 |
| JP | 2002-32731 | A | 1/2002 | JP | 2004-127230 | A | 4/2004 |
| JP | 2002-042076 | A | 2/2002 | JP | 2004-213582 | A | 7/2004 |
| JP | 2002-063557 | A | 2/2002 | JP | 2004-519916 | A | 7/2004 |
| JP | 2002-505645 | A | 2/2002 | JP | 2004-234595 | A | 8/2004 |
| JP | 2002-076750 | A | 3/2002 | JP | 2004-253858 | A | 9/2004 |
| JP | 2002-76750 | A | 3/2002 | JP | 2004-527864 | A | 9/2004 |
| JP | 2002-150245 | A | 5/2002 | JP | 2004-280390 | A | 10/2004 |
| JP | 2002-157564 | A | 5/2002 | JP | 2004-287767 | A | 10/2004 |
| JP | 2002-158529 | A | 5/2002 | JP | 2004-297249 | A | 10/2004 |
| JP | 2002-175508 | A | 6/2002 | JP | 2004-297681 | A | 10/2004 |
| JP | 2002-183690 | A | 6/2002 | JP | 2004-319848 | A | 11/2004 |
| JP | 2002-185358 | A | 6/2002 | JP | 2004-326380 | A | 11/2004 |
| JP | 2002-204117 | A | 7/2002 | JP | 2004-334268 | A | 11/2004 |
| JP | 2002-522849 | A | 7/2002 | JP | 2004-336250 | A | 11/2004 |
| JP | 2002-230128 | A | 8/2002 | JP | 2004-343000 | A | 12/2004 |
| JP | 2002-232221 | A | 8/2002 | JP | 2004-362190 | A | 12/2004 |
| JP | 2002-252117 | A | 9/2002 | JP | 2004-362341 | A | 12/2004 |
| JP | 2002-259934 | A | 9/2002 | JP | 2004-362602 | A | 12/2004 |

| | | |
|---|---|---|
| JP | 2005-5866 A | 1/2005 |
| JP | 2005-18156 A | 1/2005 |
| JP | 2005-124061 A | 5/2005 |
| JP | 2005-128592 A | 5/2005 |
| JP | 2005-129019 A | 5/2005 |
| JP | 2005-135132 A | 5/2005 |
| JP | 2005-136528 A | 5/2005 |
| JP | 2005-137032 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-210676 A | 8/2005 |
| JP | 2005-210680 A | 8/2005 |
| JP | 2005-217822 A | 8/2005 |
| JP | 2005-236339 A | 9/2005 |
| JP | 2005-244778 A | 9/2005 |
| JP | 2005-252853 A | 9/2005 |
| JP | 2005-275870 A | 10/2005 |
| JP | 2005-284352 A | 10/2005 |
| JP | 2005-293537 A | 10/2005 |
| JP | 2005-295135 A | 10/2005 |
| JP | 2005-311205 A | 11/2005 |
| JP | 2005-321305 A | 11/2005 |
| JP | 2005-322119 A | 11/2005 |
| JP | 2005-335755 A | 12/2005 |
| JP | 2005-345802 A | 12/2005 |
| JP | 2005-346820 A | 12/2005 |
| JP | 2005-352858 A | 12/2005 |
| JP | 2006-025390 A | 1/2006 |
| JP | 2006-031766 A | 2/2006 |
| JP | 2006-39902 A | 2/2006 |
| JP | 2006-42059 A | 2/2006 |
| JP | 2006-42097 A | 2/2006 |
| JP | 2006-67479 A | 3/2006 |
| JP | 2006-72706 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-270212 A | 10/2006 |
| JP | 2006-270766 A | 10/2006 |
| JP | 2006-285911 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2006-339964 A | 12/2006 |
| JP | 2007-007888 A | 1/2007 |
| JP | 2007-13120 A | 1/2007 |
| JP | 2007-28002 A | 2/2007 |
| JP | 2007-043535 A | 2/2007 |
| JP | 2007-048126 A | 2/2007 |
| JP | 2007-65822 A | 3/2007 |
| JP | 2007-79687 A | 3/2007 |
| JP | 2007-81712 A | 3/2007 |
| JP | 2007-096768 A | 4/2007 |
| JP | 2007-102348 A | 4/2007 |
| JP | 2007-122542 A | 5/2007 |
| JP | 2007-150642 A | 6/2007 |
| JP | 2007-150868 A | 6/2007 |
| JP | 2007-159083 A | 6/2007 |
| JP | 2007-159129 A | 6/2007 |
| JP | 2007-228325 A | 9/2007 |
| JP | 2007-266999 A | 10/2007 |
| JP | 2007-287128 A | 11/2007 |
| JP | 2007-312350 A | 11/2007 |
| JP | 2008-72243 A | 3/2008 |
| JP | 4069958 B2 | 4/2008 |
| JP | 2008-519347 A | 6/2008 |
| JP | 2008-160874 A | 7/2008 |
| JP | 11-175678 A | 1/2009 |
| JP | 2009-27291 A | 2/2009 |
| NL | 9100176 A | 3/1992 |
| NL | 9100347 A | 3/1992 |
| WO | 99/67754 A1 | 12/1999 |
| WO | 00/10122 A2 | 2/2000 |
| WO | 01/95242 A2 | 12/2001 |
| WO | 02/061675 A1 | 8/2002 |
| WO | 02/097723 A1 | 12/2002 |
| WO | 03/079305 A1 | 9/2003 |
| WO | 2004/036772 A1 | 4/2004 |
| WO | 2004/070879 A | 8/2004 |
| WO | 2004/072892 A1 | 8/2004 |
| WO | 2005/073937 A | 8/2005 |
| WO | 2005/115849 A1 | 12/2005 |
| WO | 2006/045682 A | 5/2006 |
| WO | 2006/048663 A1 | 5/2006 |
| WO | 2007/083574 A1 | 7/2007 |
| WO | 2007/083575 A1 | 7/2007 |
| WO | 2007/086130 A1 | 8/2007 |
| WO | 2007/119310 A1 | 10/2007 |
| WO | 2007/125683 A1 | 11/2007 |
| WO | 2007/138857 A1 | 12/2007 |
| WO | 2008/007606 A | 1/2008 |
| WO | 2008/140037 A1 | 11/2008 |
| WO | 2009/011376 A1 | 1/2009 |
| WO | 2009/081719 A1 | 7/2009 |

OTHER PUBLICATIONS

Dokai et al.: "Wireless IC Device, and Component for Wireless IC Device", U.S. Appl. No. 11/930,818, filed Oct. 31, 2007.
Kato et al.: "Wireless IC Device"; U.S. Appl. No. 12/042,399, filed Mar. 5, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Kato: "Composite Antenna," U.S. Appl. No. 12/845,846, filed Jul. 29, 2010.
Kato et al.: "Radio Frequency IC Device and Radio Communication System," U.S. Appl. No. 12/859,340, filed Aug. 19, 2010.
Kato et al.: "Wireless IC Device," U.S. Appl. No. 12/859,880, filed Aug. 20, 2010.
Kataya et al.: "Wireless IC Device, Electronic Apparatus, and Method for Adjusting Resonant Frequency of Wireless IC Device," U.S. Appl. No. 12/861,945, filed Aug. 24, 2010.
Osamura et al.: "Packaging Material With Electromagnetic Coupling Module," U.S. Appl. No. 12/536,663, filed Aug. 6, 2009.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Kato et al.: "Antenna", U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.

Kato et al.: "Wireless IC Device and Wireless IC Device Composite Component"; U.S. Appl. No. 12/276,444; filed Nov. 24, 2008.
Dokai et al.: "Optical Disc"; U.S. Appl. No. 12/326,916; filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185; filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661; filed Sep. 7, 2007.
Dokai et al.: "Antenna and Radio IC Device"; U.S. Appl. No. 12/350,307, filed Jan. 8, 2009.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same", U.S. Appl. No. 12/388,826, filed Feb. 19, 2009.
Kato et al.: "Wireless IC Device", U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Kato et al.: "Article Having Electromagnetic Coupling Module Attached Thereto"; U.S. Appl. No. 12/401,767, filed Mar. 1, 2009.
Taniguchi et al.: "Antenna Device and Radio Frequency IC Device"; U.S. Appl. No. 12/326,117, filed Dec. 2, 2008.
Kato et al.: "Container With Electromagnetic Coupling Module"; U.S. Appl. No. 12/426,369, filed Apr. 20, 2009.
Kato; "Wireless IC Device"; U.S. Appl. No. 12/429,346, filed Apr. 24, 2009.
Kato et al.: "Wireless IC Device and Manufacturing Method Thereof," U.S. Appl. No. 12/432,854, filed Apr. 30, 2009.
Kato et al.: "Wireless IC Device," U.S. Appl. No. 12/469,896, filed May 21, 2009.
Ikemoto et al.: "Wireless IC Device," U.S. Appl. No. 12/496,709, filed on Jul. 2, 2009.
Official communication issued in counterpart International Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
Official communication issued in counterpart International Application No. PCT/JP2008/071502, mailed Feb. 24, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Official communication issued in counterpart International Application No. PCT/JP2008/062947, mailed Aug. 19, 2008.
Official communication issued in counterpart International Application No. PCT/JP2008/056026, mailed Jul. 1, 2008.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Official communication issued in International Application No. PCT/JP2008/058614, mailed on Jun. 10, 2008.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags")", RFID, pp. 112-126.
Official communication issued in related U.S. Appl. No. 12/042,399, mailed on Aug. 25, 2008.
English translation of NL9100176, published on Mar. 2, 1992.
English translation of NL9100347, published on Mar. 2, 1992.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Application No. PCT/JP2007/066007, mailed on Nov. 27, 2007.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Official Communication issued in International Patent Application No. PCT/JP2008/050945, mailed on May 1, 2008.
Official Communication issued in International Patent Application No. PCT/JP2008/061442, mailed on Jul. 22, 2008.
Official Communication issued in International Patent Application No. PCT/JP2008/063025, mailed on Aug. 12, 2008.
Official Communication issued in International Patent Application No. PCT/JP2009/053693, mailed on Jun. 9, 2009.
Official Communication issued in International Patent Application No. PCT/JP2009/053690, mailed on Jun. 2, 2009.
Official Communication issued in International Patent Application No. PCT/JP2009/055758, mailed on Jun. 23, 2009.
Official Communication issued in International Patent Application No. PCT/JP2009/057482, mailed on Jul. 21, 2009.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105; filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.

Kato et al.: "Component of Wireless IC Device and Wireless IC Device", U.S. Appl. No. 12/944,099, filed Nov. 11, 2010.

Kato et al.: Wireless IC Device and Manufacturing Method Thereof; U.S. Appl. No. 12/961,599, filed Dec. 7, 2010.

Kataya et al.: "Radio Frequency IC Device and Electronic Apparatus"; U.S. Appl. No. 12/959,454, filed Dec. 3, 2010.

Ikemoto et al.: Radio IC Device; U.S. Appl. No. 12/981,582; filed Dec. 30, 2010.

Ikemoto et al.: Wireless IC Device and Electronic Apparatus; U.S. Appl. No. 13/022,693; filed Feb. 8, 2011.

* cited by examiner

WIRELESS IC DEVICE

BACKGROUND OF THE INVENTION

1. Field of the Invention

The present invention relates to a wireless integrated circuit (IC) device, and more particularly, to a wireless IC device including a wireless IC that is used in radio frequency identification (RFID) systems.

2. Description of the Related Art

For example, an RFID tag described in Japanese Unexamined Patent Application Publication No. 2007-102348 is a known wireless IC device used in access management, commuter passes, credit cards and other suitable applications. FIG. 14 is an exploded perspective view of an RFID tag 500 described in Japanese Unexamined Patent Application Publication No. 2007-102348.

The RFID tag 500 illustrated in FIG. 14 includes antenna substrates 502a to 502d, chip connection terminals 506a and 506b, an IC chip 508, sealing resin 510, and an antenna coil L. The antenna coil L is defined by antenna patterns 504a to 504d and through holes b501 to b504.

The antenna substrates 502 are rectangular-shaped insulator layers. The antenna patterns 504a to 504d are line-shaped conductors that each have a spiral shape and are respectively provided on the antenna substrates 502a to 502d. The through hole b501 connects the antenna patterns 504a and 504b to each other. The through hole b502 connects the antenna patterns 504b and 504c to each other. The through hole b503 connects the antenna patterns 504c and 504d to each other. The through hole b504 connects the antenna patterns 504a and 504d to each other.

The chip connection terminal 506a is provided on the antenna substrate 502a and is connected to the antenna pattern 504a. The chip connection terminal 506b is provided on the antenna substrate 502a and is electrically connected to the through hole b504. The IC chip 508 is mounted on the chip connection terminals 506a and 506b. Then, the IC chip 508 is protected by being covered with the sealing resin 510.

In the RFID tag 500, the antenna coil L and the IC chip 508 are connected to each other. Thus, the RFID tag 500 exchanges signals with a reader/writer, which is not illustrated.

In the RFID tag 500 described in Japanese Unexamined Patent Application Publication No. 2007-102348, the through hole b501 and the through holes b502 to b504 extend parallel to one another. Therefore, floating capacitances are respectively generated between the through hole b504 and the through holes b501 to b503. The generation of such floating capacitances causes the resonant frequency of the RFID tag 500 to deviate from a desired value.

SUMMARY OF THE INVENTION

To overcome the problems described above, preferred embodiments of the present invention provide a wireless IC device that prevents deviations of the resonant frequency of the wireless IC device from a desired value.

According to a preferred embodiment of the present invention, a wireless IC device includes a laminate in which a plurality of insulator layers are stacked on top of one another, an antenna coil that has a helical shape, includes a plurality of conductor layers and a plurality of via hole conductors being connected to one another, and includes a first end portion that is disposed in the conductor layer that is provided on the lowermost side in a direction in which the layers are stacked and a second end portion that is disposed in the conductor layer provided on the uppermost side in the direction in which the layers are stacked, a wireless IC that is electrically connected to the first end portion and the second end portion, and a penetrating via hole conductor that is provided between the first end portion and the wireless IC and penetrates through the plurality of insulator layers. The plurality of via hole conductors includes a first via hole conductor arranged such that a length of a current path thereto from the second end portion is the shortest among the plurality of via hole conductors in the antenna coil and a second via hole conductor, which is a via hole conductor other than the first via hole conductor. In addition, a distance between the penetrating via hole conductor and the first via hole conductor is greater than a distance between the penetrating via hole conductor and the second via hole conductor when viewed in plan from the direction in which the layers are stacked.

With the wireless IC device according to various preferred embodiments of the present invention, deviations of the resonant frequency from the desired value are prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Wireless IC devices according to preferred embodiments of the present invention will be described with reference to the

First Preferred Embodiment

Figure 1:
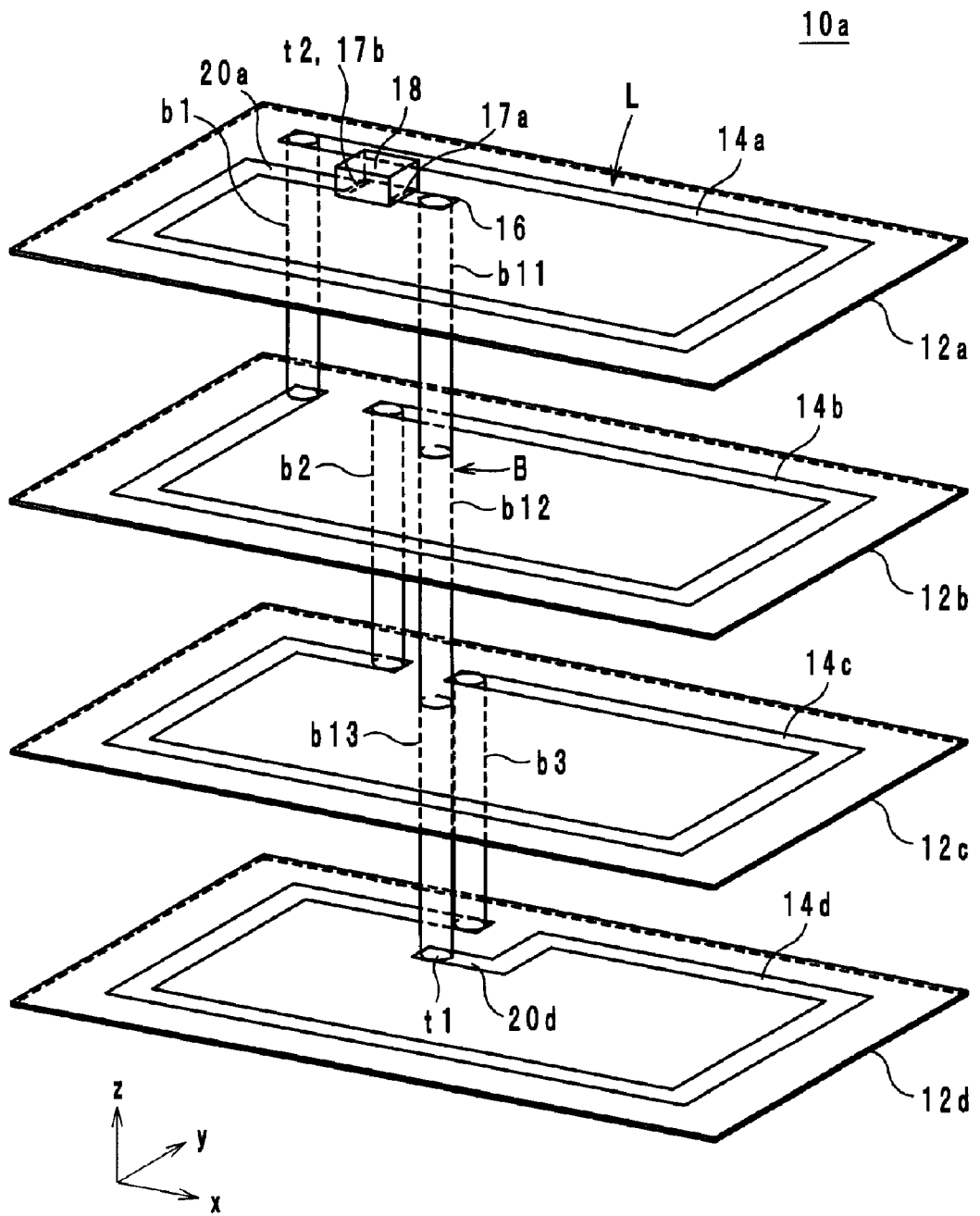
FIG. 1 is an exploded perspective view of a wireless IC device according to a first preferred embodiment of the present invention.
Figure 2A:
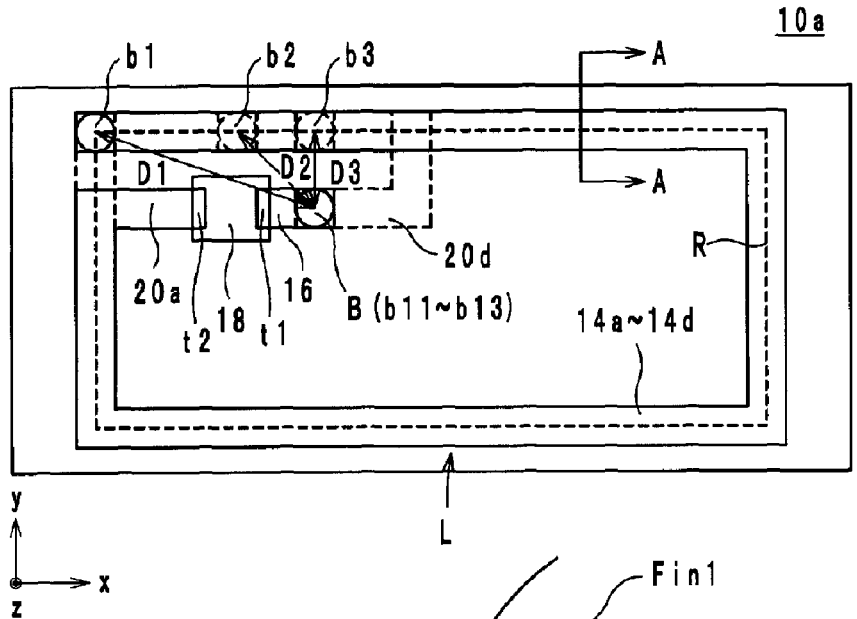
FIG. 2A shows the wireless IC device illustrated in FIG. 1 in plan from a z-axis direction.
Figure 2B:
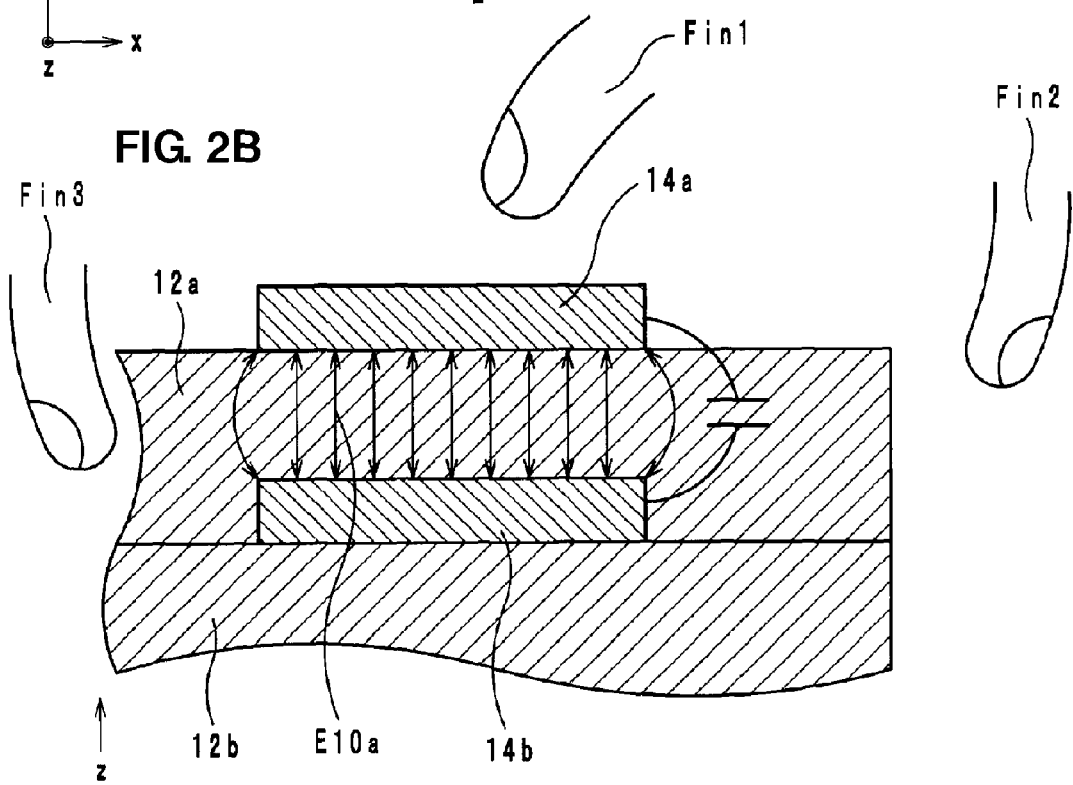
FIG. 2B is a sectional view of the wireless IC device illustrated in FIG. 2A taken along line A-A.
Figure 3:
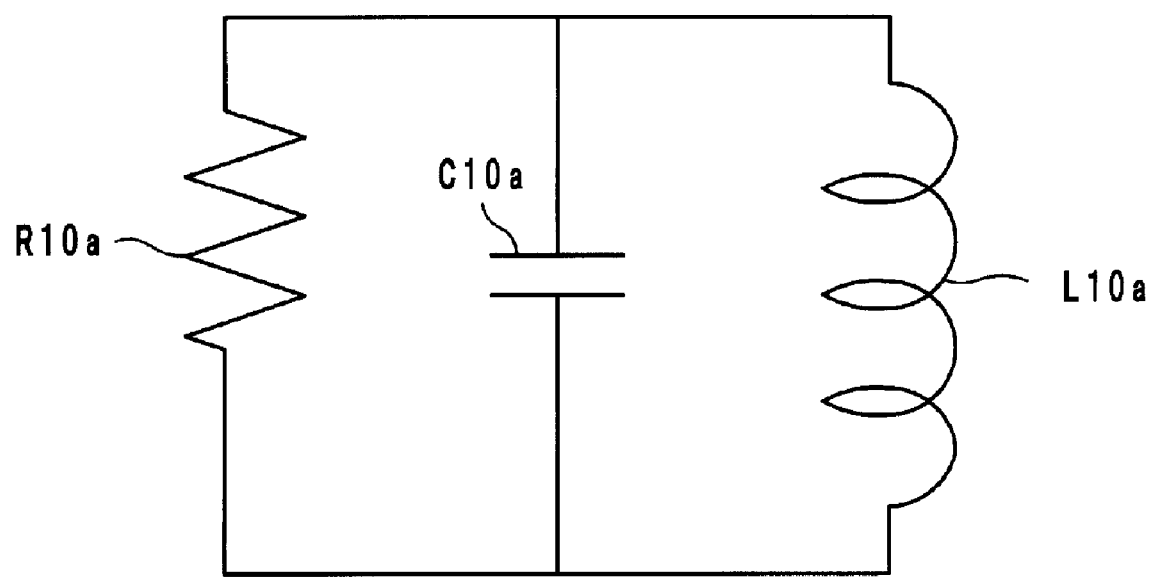
FIG. 3 is an equivalent circuit diagram of the wireless IC device illustrated in FIG. 1.

A wireless IC device according to a first preferred embodiment of the present invention will be described with reference to the drawings. FIG. 1 is an exploded perspective view of a wireless IC device 10a according to the first preferred embodiment. In FIG. 1, the x-axis extends in the direction of the long edges of the wireless IC device 10a, the y-axis extends in the direction of the short edges of the wireless IC device 10a, and the z-axis extends in a direction in which layers of the wireless IC device 10a are stacked. FIG. 2A shows the wireless IC device 10a in plan from the z-axis direction. FIG. 2B is a sectional view of the wireless IC device 10a illustrated in FIG. 2A taken along line A-A. FIG. 3 is an equivalent circuit diagram of the wireless IC device 10a illustrated in FIG. 1.

The wireless IC device 10a preferably has a resonant frequency of about 13.56 MHz, for example, and communicates transmission and reception signals to and from a reader/writer using an electromagnetic induction method. As illustrated in FIG. 1, the wireless IC device 10a includes insulator layers 12a to 12d, a connector 16, a wireless IC 18, an antenna coil L, and via hole conductors b11 to b13. Furthermore, the antenna coil L has a helical shape that spirals and extends in the z-axis direction as a result of coil conductors (conductor layers) 14a to 14d, connectors (conductor layers) 20a and 20d and via hole conductors b1 to b3 being connected to one another. Hereafter, when indicating specific structural elements, alphabetic and/or numerical characters are affixed after the reference symbols, whereas when referring to the structural elements in general, the alphabetical and/or numerical characters affixed after the reference symbols are omitted.

The insulator layers 12 are sheets that preferably have a rectangular shape and are made of an insulating material, and preferably are, for example, manufactured using liquid crystal polymer (LCP) or polyethylene terephthalate (PET) resin sheets.

The coil conductors 14a to 14d are preferably respectively formed on the insulator layers 12a to 12d using a metal foil, such as copper foil or aluminum foil, for example, so as to have the same or substantially the same line width. Each of the coil conductors 14 preferably has a shape in which four line-shaped conductors that extend along the edges of the insulator layer 12 are connected to each other to define a substantially rectangular ring shape, for example, from which a portion has been cut out. In other words, the coil conductors 14 have a length less than one circuit around a coil axis of the antenna coil L. Furthermore, as illustrated in FIG. 2A, the coil conductors 14a to 14d are preferably superposed with one another to thereby define a single rectangular ring-shaped path R when viewed in plan from the z-axis direction.

The via hole conductor b1 is a connection conductor that penetrates through the insulator layer 12a and connects the coil conductor 14a and the coil conductor 14b to each other. The via hole conductor b2 is a connection conductor that penetrates through the insulator layer 12b and connects the coil conductor 14b and the coil conductor 14c to each other. The via hole conductor b3 is a connection conductor that penetrates through the insulator layer 12c and connects the coil conductor 14c and the coil conductor 14d to each other. In addition, when viewed in plan from the z-axis direction, as illustrated in FIG. 1, it is preferable that the via hole conductors b1 to b3 be provided at locations so as to be superposed with the coil conductors 14a and 14d, for example.

The connector 16 is preferably a line-shaped conductor made of a metal foil on the insulator layer 12a, for example, which is disposed on the uppermost side in the z-axis direction, so as to be inside the rectangular ring-shaped path defined by the coil conductors 14. One end of the connector 16 includes a land conductor 17a.

The connector 20a is preferably a line-shaped conductor made of a metal foil on the insulator layer 12a, for example, which is arranged on the uppermost side in the z-axis direction. One end of the connector 20a is connected to an end portion of the coil conductor 14a on a side not connected to the via hole conductor b1. The other end of the connector 20a defines an end portion t2 of the antenna coil L and a land conductor 17b.

The connector 20d is preferably a line-shaped conductor made of a metal foil on the insulator layer 12d, for example, which is arranged on the lowermost side in the z-axis direction. One end of the connector 20d is connected to an end portion of the coil conductor 14d on a side not connected to the via hole conductor b3. The other end of the connector 20d is superposed with the connector 16 when viewed in plan from the z-axis direction and defines an end portion t1 of the antenna coil L.

The wireless IC 18 is electrically connected to the land conductors 17a and 17b and is an integrated circuit arranged to process transmission and reception signals exchanged with a reader/writer. The wireless IC 18 is preferably directly mounted on the land conductors 17a and 17b with solder or other suitable material, for example. When the wireless IC device 10a is used as a commuter pass, the wireless IC 18 preferably stores information regarding the zones in which the commuter pass can be used, information regarding the owner of the commuter pass, and other applicable information, for example. This information may be rewritable and an information processing function other that of the RFID system including the reader/writer and the wireless IC device 10a may be provided.

The via hole conductors b11 to b13 preferably define a single via hole conductor B and are provided between the end portion t1 and the wireless IC 18. Specifically, the via hole conductors b11 to b13 are connection conductors arranged so as to respectively penetrate through the insulator layers 12a to 12c and connect the connector 16 and the end portion t1 of the connector 20d to each other. Therefore, the via hole conductors b11 to b13 connect the connector 16, which is a conductor layer provided on the uppermost side in the z-axis direction, and the connector 20d, which is a conductor layer provided on the lowermost side in the z-axis direction, to each other.

The wireless IC device 10a is formed by stacking the plurality of insulator layers 12a to 12d illustrated in FIG. 1 on top of one another. In this manner, the wireless IC device 10a defines an equivalent circuit as illustrated in FIG. 3. In more detail, a capacitance C10a of the coil conductors 14 is connected in parallel with and between an inductance L10a of the antenna coil L and a resistance R10a of the wireless IC 18. In addition, a parasitic capacitance of the wireless IC 18 is omitted from FIG. 3.

The wireless IC device 10a effectively prevents deviations of the resonant frequency from the desired value. Hereafter, this structure will be described with reference to FIG. 2A.

In the wireless IC device 10a, the current path lengths from the end portion t2 to the via hole conductors b1, b2 and b3 in the antenna coil L increase in this order. The term "current paths lengths" means the lengths of the portions of the antenna coil L that are provided from the end portion t2 to the via hole conductors b1, b2 and b3. In addition, as illustrated in FIG. 2A, a distance D1 between the via hole conductor B and the via hole conductor b1 is greater than distances D2 and D3 between the via hole conductor B and the other via hole conductors b2 and b3 when viewed in plan from the z-axis direction. Furthermore, in this preferred embodiment, the distance D2 is greater than the distance D3.

In addition, in the wireless IC device 10a, the via hole conductor B is preferably arranged so as to be closer to the wireless IC 18 than the via hole conductors b1 to b3, as illustrated in FIG. 2A.

With the above-described wireless IC device 10a, as will be described below, deviations of the resonant frequency from the desired value are effectively prevented.

Figure 14:
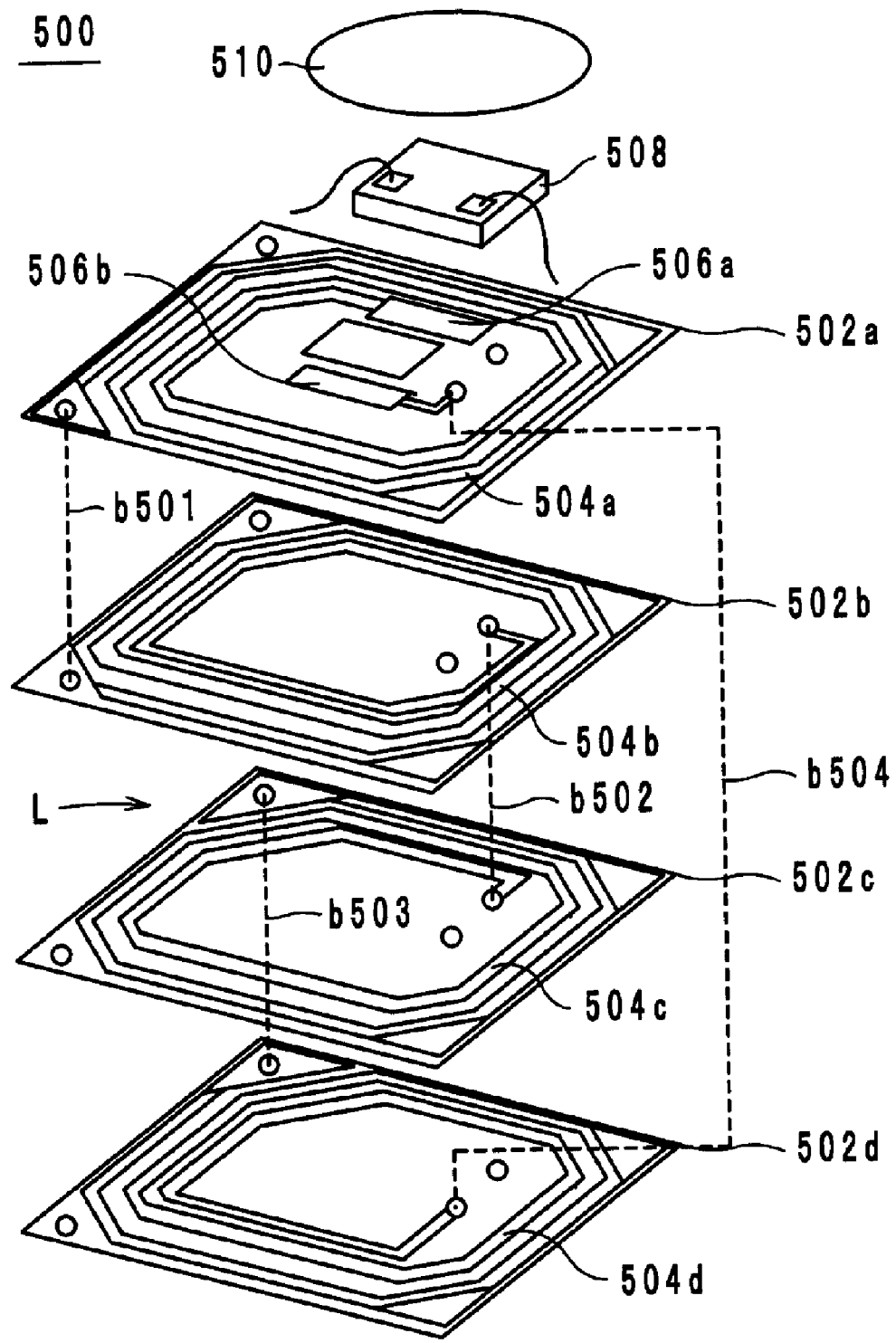
FIG. 14 is an exploded perspective view of an RFID tag described in Japanese Unexamined Patent Application Publication No. 2007-102348.

In more detail, the antenna patterns 504 of the related art illustrated in FIG. 14 are provided on the plurality of antenna substrates 502 and are connected to one another by the through holes b501 to b504. The through hole b504 connects the antenna patterns 504a and 504d to each other and therefore extends parallel to the through hole b501. The through hole b501 is connected in the vicinity of one terminal of the IC chip 508 and the through hole b504 is connected in the vicinity of the other terminal of the IC chip 508. Within the RFID tag 500, the portion with the highest resistance value is the IC chip 508. Therefore, the potential difference between the through hole b501 and the through hole b504 is greater than the potential differences between the through hole b501 and the other through holes b502 and b503.

Here, a floating capacitance is generated between the through hole b501 and each of the through holes b502 to b504. Therefore, charging and discharging of a charge occurs due to the potential differences between the through hole b501 and the through holes b502 to b504. In particular, a large amount of charge is charged and discharged between the through hole b501 and the through hole b504, between which the greatest potential difference is generated. Thus, when charging and discharging of a charge occurs, the through hole b501 and the through hole b504 function as a capacitor and the resonant frequency of the antenna coil L deviates. Therefore, it is preferable that the floating capacitance generated between the through hole b501 and the through hole b504, between which a large potential difference is generated, be made as small as possible.

Accordingly, as illustrated in FIG. 2A, in the wireless IC device 10a, the distance D1 between the via hole conductor B and the via hole conductor b1 is greater than the distances D2 and D3 between the via conductor B and the other via hole conductors b2 and b3 when viewed in plan from the z-axis direction. Thus, the floating capacitance generated between the via hole conductor B and the via hole conductor b1 is less than the floating capacitances generated between the via hole conductor B and the other via hole conductors b2 and b3. That is, in the wireless IC device 10a, the floating capacitance generated between the via hole conductor B and the via hole conductor b1, between which the greatest potential difference is generated, is less than the floating capacitances generated between the via hole conductor B and the other via hole conductors b2 and b3. Accordingly, the charging and discharging of a large amount of charge between the via hole conductor B and the via hole conductor b1 is prevented. As a result, the via hole conductor B and the via hole conductor b1 functioning as a capacitor is suppressed and deviations of the resonant frequency of the antenna coil L from the desired value are prevented.

According to the above-described wireless IC device 10a, variations in the resonant frequency during use are reduced, as will be described below.

In the wireless IC device 10a, the coil conductors 14a to 14d are superposed with one another in the z-axis direction, as illustrated in FIG. 2A. Therefore, when a current flows through the antenna coil L, as illustrated in FIG. 2B, electric force lines E10a are generated that contribute to the formation of the capacitance C10a shown in FIG. 3 between opposing coil conductors 14, that is, between the coil conductor 14a and the coil conductor 14b in FIG. 2B. The electric force lines E10a are not generated above the coil conductor 14a in the z-axis direction. As a result, as illustrated in FIG. 2B, the electric force lines E10a do not pass through a person's finger Fin1, even when the person's finger Fin1 is close to the coil conductor 14a. Consequently, the capacitance C10a does not vary depending on the manner in which the wireless IC device 10a is held and variations of the resonant frequency of the wireless IC device 10a with the condition of use are effectively prevented.

Furthermore, as illustrated in FIG. 2A, in the wireless IC device 10a, the via hole conductor B is preferably arranged so as to be closer to the wireless IC 18 than are the via hole conductors b1 to b3. Accordingly, the length of the connector 16, which connects the via hole conductor B and the wireless IC 18 to each other, is reduced. The connector 16 is provided inside the antenna coil L when viewed in plan from the z-axis direction, and therefore, magnetic flux generated by the antenna coil L is disturbed. Therefore, by shortening the connector 16, as in the wireless IC device 10a, disturbances of the magnetic flux of the antenna coil L by the connector 16 is prevented. As a result, the inductance value of the antenna coil L can be increased.

In addition, the coil conductors 14a to 14d are preferably superposed on top of one another when viewed in plan from the z-axis direction. Thus, the magnetic flux generated by the coil conductors 14a to 14d is prevented from leaking out from the spaces between the coil conductors 14a to 14d in the z-axis direction. That is, the magnetic flux generated by the coil conductors 14a to 14d can be prevented from leaking to outside the wireless IC device 10a. As a result, even when the dielectric constant of the surroundings of the wireless IC device 10a is changed due to a person's hand contacting the wireless IC device 10a, the magnetic flux does not pass through the person's hand, and therefore, the floating capacitances generated between the coil conductors 14a to 14d do not substantially change. Accordingly, in the wireless IC device 10a, changes in the resonant frequency of the antenna coil L due to changes in the floating capacitances between the coil conductors 14a to 14d during use is effectively prevented.

In addition, in the wireless IC device 10a, the coil conductor 14d, which is provided on the lowermost side in the z-axis direction, winds through a length of less than one circuit around the coil axis of the antenna coil L. Consequently, the potential difference between the via hole conductor B and the via hole conductor b3 is relatively small. Therefore, even when the via hole conductor B and the via hole conductor b3 are arranged close to each other, as in the wireless IC device 10a, the resonant frequency of the antenna coil L is not likely to vary.

Furthermore, the direction of the current flowing through the via hole conductor B and the direction of the current flowing through the via hole conductors b1 to b3 are opposite to each other. Therefore, in the antenna coil L, the inductance value is likely to change due to the magnetic coupling of the via hole conductor B and the via hole conductors b1 to b3.

Thus, it is preferable that the distances between the via hole conductor B and the via hole conductors b1 to b3 be as large as possible.

Second Preferred Embodiment

Figure 4:
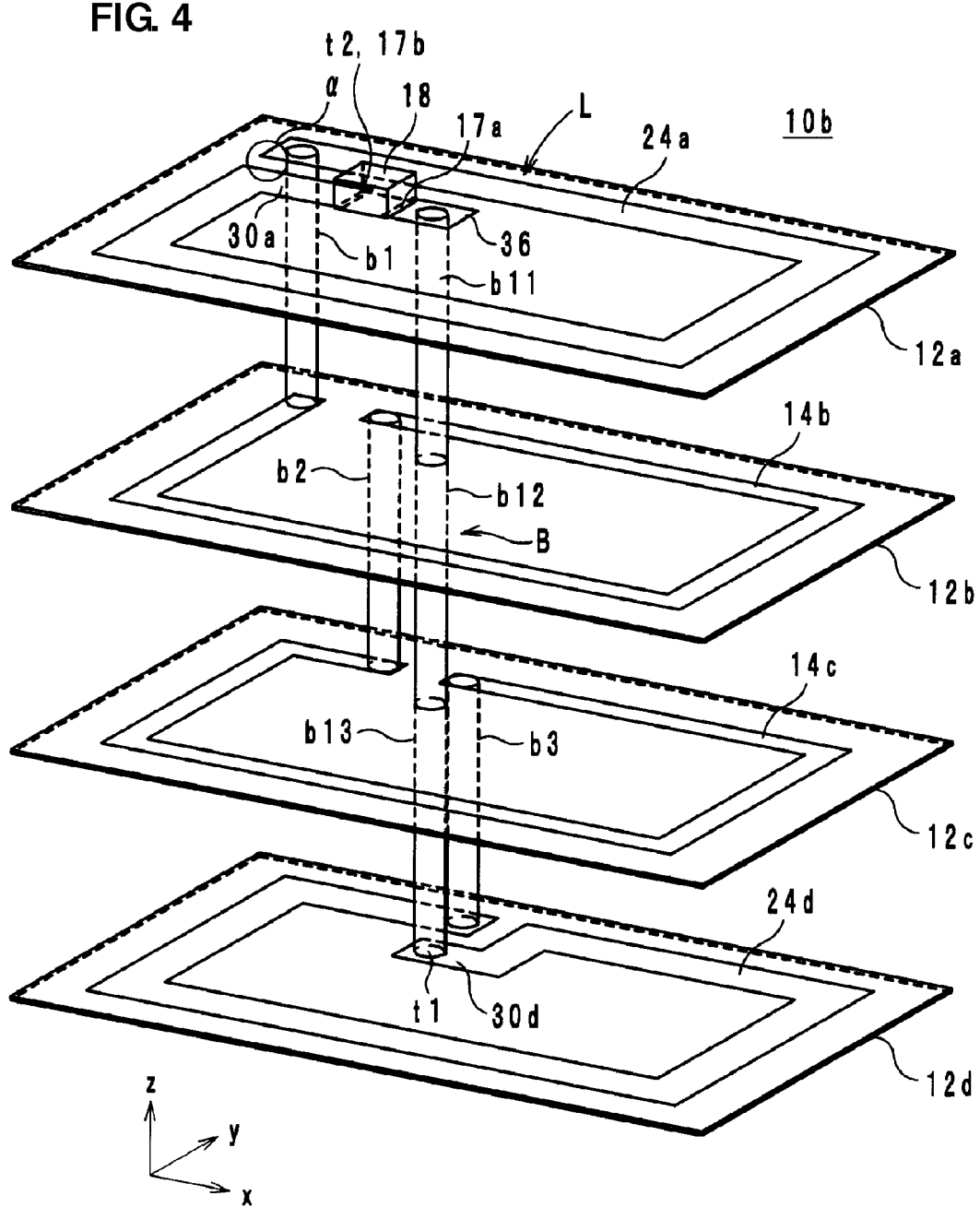
FIG. 4 is an exploded perspective view of a wireless IC device according to a second preferred embodiment of the present invention.
Figure 5:
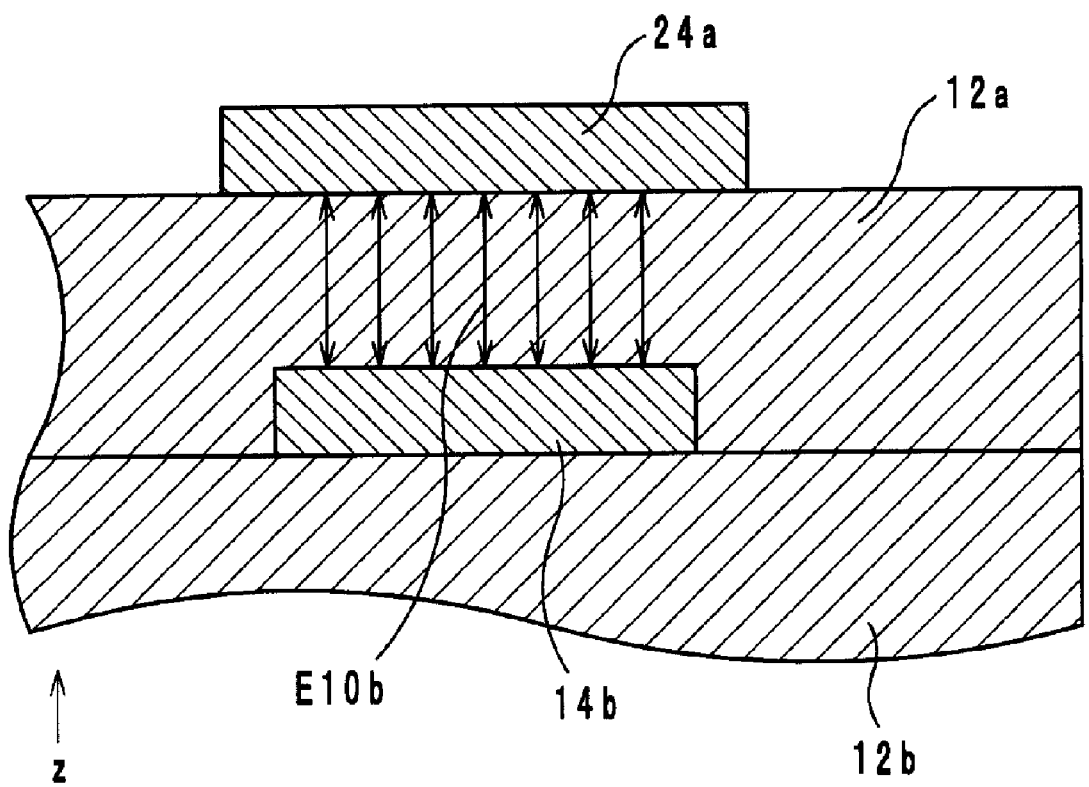
FIG. 5 is a sectional view of the wireless IC device illustrated in FIG. 4 in the zy-plane.

A wireless IC device according to a second preferred embodiment of the present invention will be described with reference to the drawings. FIG. 4 is an exploded perspective view of a wireless IC device 10b according to the second preferred embodiment. In FIG. 4, the x-axis extends in the direction of the long edges of the wireless IC device 10b, the y-axis extends in the direction of the short edges of the wireless IC device 10b, and the z-axis extends in a direction in which layers of the wireless IC device 10b are stacked. FIG. 5 is a sectional view of the wireless IC device 10b in the zy-plane. In addition, in FIGS. 4 and 5, features and elements that are the same as those in FIGS. 1 and 2A are denoted by the same reference characters.

The difference between the wireless IC device 10a and the wireless IC device 10b is that the coil conductors 14a and 14d are replaced with coil conductors 24a and 24d. The line width of the coil conductors 24a and 24d is greater than the line width of the coil conductors 14b and 14c. Accordingly, the coil conductors 24a and 24d, which are disposed at either end in the z-axis direction, preferably have a line width that is greater than the line width of the other coil conductors 14b and 14c.

Furthermore, the coil conductors 24a and 24d cover at least a portion of the other coil conductors 14b and 14c in the line width direction when viewed in plan from the z-axis direction. As an example, a description of the coil conductor 24a and the coil conductor 14b will be provided. As illustrated in FIG. 5, the coil conductor 14b is arranged such that both edges thereof are disposed inside the coil conductor 24a and do not protrude therefrom in the line width direction. Therefore, electric force lines E10b generated between the coil conductor 24a and the coil conductor 14b are not likely to extend outside the coil conductor 24a when viewed in plan from the z-axis direction. As a result, the electric force lines E10b are not likely to pass through a person's hand when the wireless IC device 10b is being held. As a result, variations in the resonant frequency of the wireless IC device 10b during use are more effectively prevented.

In addition, the coil conductors 24a and 24d cover at least a portion of the other coil conductors 14b and 14c when viewed in plan from the z-axis direction. The phase "covers at least a portion of" means, for example, that the coil conductor 24a need not entirely cover the coil conductor 14b, since there is a portion (portion α in FIG. 4) above the coil conductor 14b in the z-axis direction in which the coil conductor 24a is not provided.

In addition, since other structures of the wireless IC device 10b are substantially the same as those of the wireless IC device 10a, description thereof is omitted.

Third Preferred Embodiment

Figure 6:
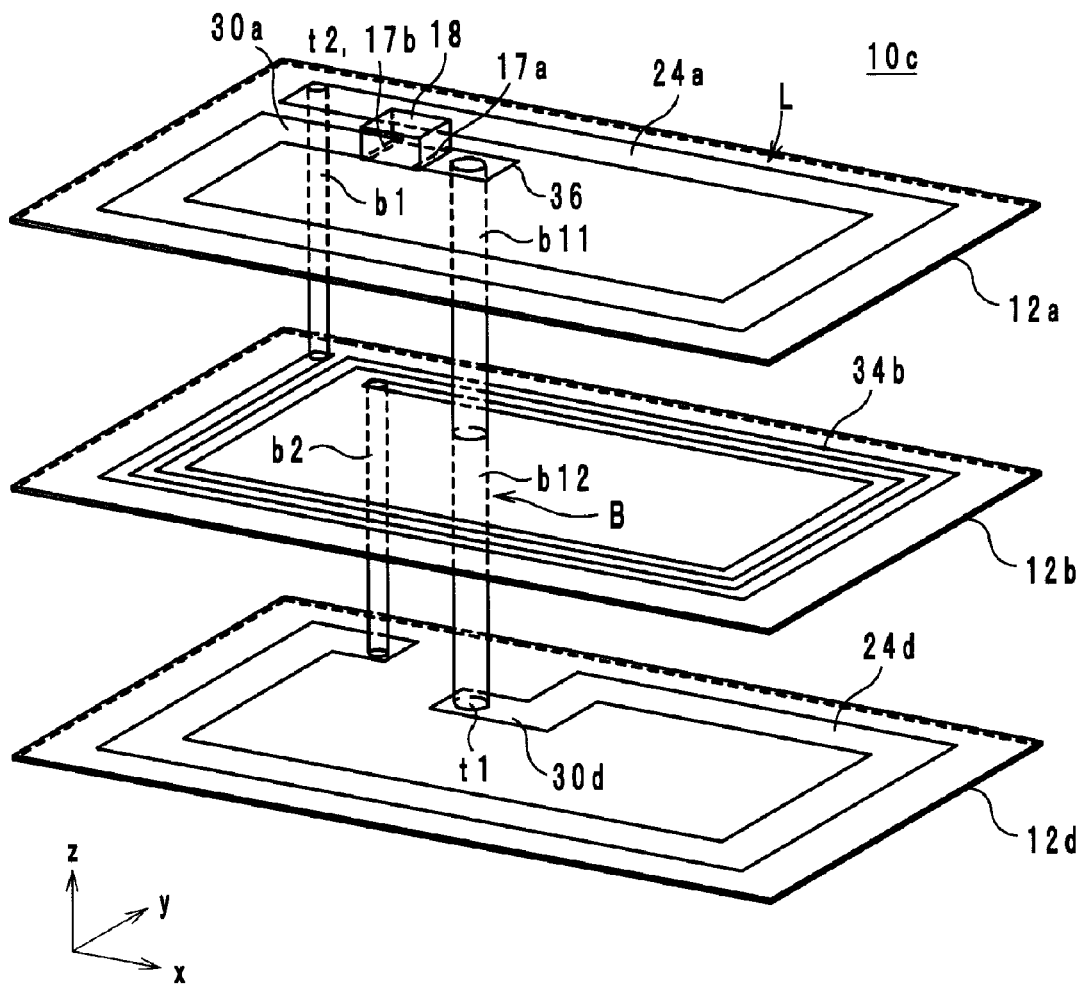
FIG. 6 is an exploded perspective view of a wireless IC device according to a third preferred embodiment of the present invention.
Figure 7:
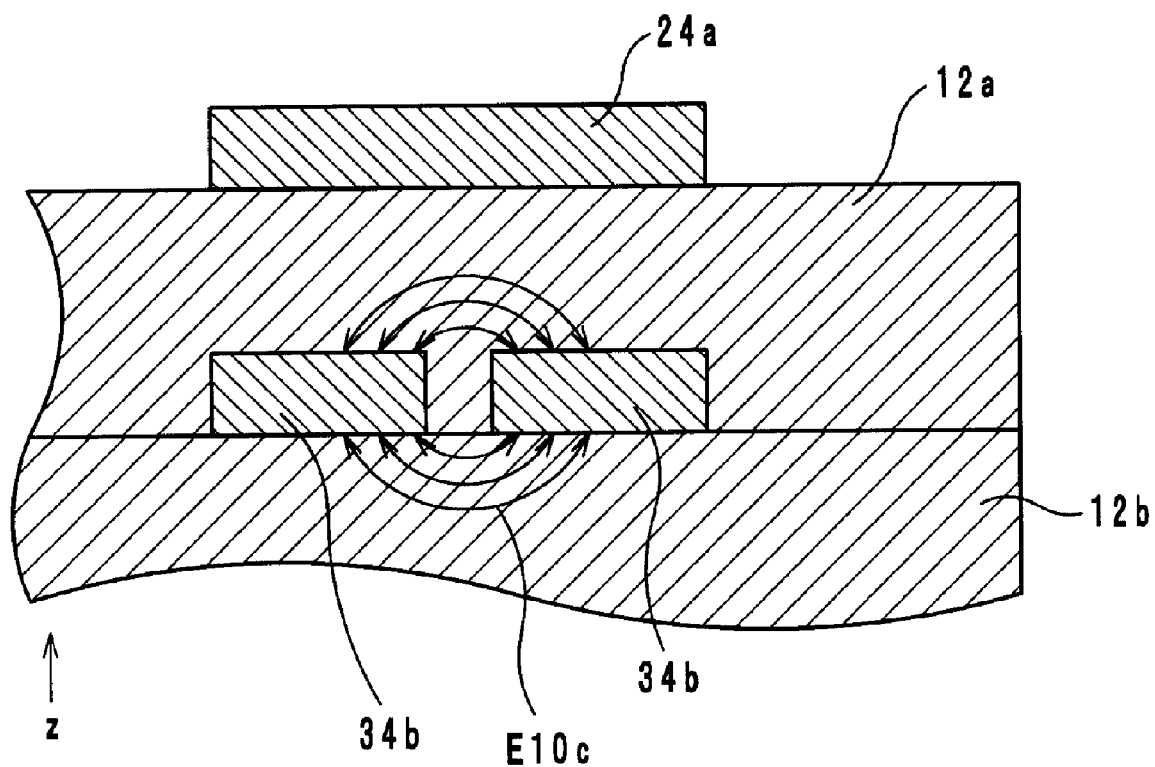
FIG. 7 is a sectional view of the wireless IC device illustrated in FIG. 6 in the zy-plane.

A wireless IC device according to a third preferred embodiment of the present invention will be described with reference the drawings. FIG. 6 is an exploded perspective view of a wireless IC device 10c according to the third preferred embodiment. In FIG. 6, the x-axis extends in the direction of the long edges of the wireless IC device 10c, the y-axis extends in the direction of the short edges of the wireless IC device 10c, and the z-axis extends in a direction in which layers of the wireless IC device 10c are stacked. FIG. 7 is a sectional view of the wireless IC device 10c in the zy-plane. In addition, in FIGS. 6 and 7, structures that are the same as those in FIGS. 4 and 5 are denoted by the same reference symbols.

The difference between the wireless IC device 10b and the wireless IC device 10c is that the insulator layer 12c is not provided and the coil conductor 14b is replaced with a coil conductor 34b.

In contrast to the wireless IC device 10b, which was preferably formed by stacking four of the insulator layers 12, the wireless IC device 10c is preferably formed by stacking three of the insulator layers 12, as illustrated in FIG. 6. Consequently, in the wireless IC device 10c, the number of coil conductors 24 and 34 is one less than in the wireless IC device 10b. Accordingly, in the wireless IC device 10c, the number of turns of the antenna coil L of the wireless IC device 10c is preferably set to be the same as the number of turns of the antenna coil L of the wireless IC device 10b by setting the length of the coil conductor 34b be equal to or substantially equal to two circuits.

In addition, since other features and elements of the wireless IC device 10c are substantially the same as those of the wireless IC device 10b, description thereof will be omitted.

With the wireless IC device 10c, similar to the wireless IC device 10a, deviations of the resonant frequency of the antenna coil L from the desired value are prevented.

Furthermore, provided that the coil conductors 24a and 24d, which are arranged at either end in the z-axis direction, extend through a length of less than one circuit around the coil axis of the antenna coil L, the coil conductor 34b, which is another coil conductor other than the coil conductors 24a and 24d, may extend through a length of at least one circuit around the coil axis of the antenna coil L. As a result, as will be described below, variations in the resonant frequency during use can be reduced and the number of turns of the antenna coil L can be increased even with a relatively small number of stacked layers.

Since the coil conductor 34b winds a plurality of times around the coil axis as illustrated in FIG. 6, wires of the coil conductor 34b are arranged side by side so as to be close to each other on the insulator layer 12b, as illustrated in FIG. 7. Therefore, when a current flows through the antenna coil L, electric force lines E10c are generated above and below the coil conductor 34b in the z-axis direction.

However, since the coil conductor 34b is not a coil conductor arranged at either end in the z-axis direction, there is a sufficient distance between the coil conductor 34b and outside the wireless IC device 10c. Therefore, as illustrated in FIG. 7, the electric force lines E10c generated between the wires of the coil conductor 34b do not substantially extend from the wireless IC device 10c. Therefore, when the wireless IC device 10c is held in a person's hand, changes in the capacitance of the antenna coil L, caused by the electric force lines E10c passing through the person's hand, are prevented.

In particular, as illustrated in FIG. 7, the coil conductors 24a and 24d cover at least a portion of the other coil conductor 34b in the line width direction when viewed in plan from the z-axis direction, whereby, as will be described below, variations in the resonant frequency of the wireless IC device 10c during use can be more effectively prevented. As illustrated in FIG. 7, the coil conductor 34b is preferably arranged such that both ends thereof are arranged inside the coil conductors 24a and 24d (the coil conductor 24d is not illustrated in FIG. 7) so as not to extend therefrom in the line width direction. Consequently, the electric force lines E10c are blocked by the coil conductors 24a and 24d and extension of the electric force lines E10c to outside the wireless IC device 10c is more effectively prevented. As a result, variations in the resonant frequency of the wireless IC device 10c during use can be more effectively prevented. In addition, since electric force lines generated between the coil conductor 24a and the coil conductor 34b are not likely to extend to outside the coil conductor 24a, similar to the first preferred embodiment and the second preferred embodiment, variations of the resonant frequency are effectively prevented.

Fourth Preferred Embodiment

Figure 8:
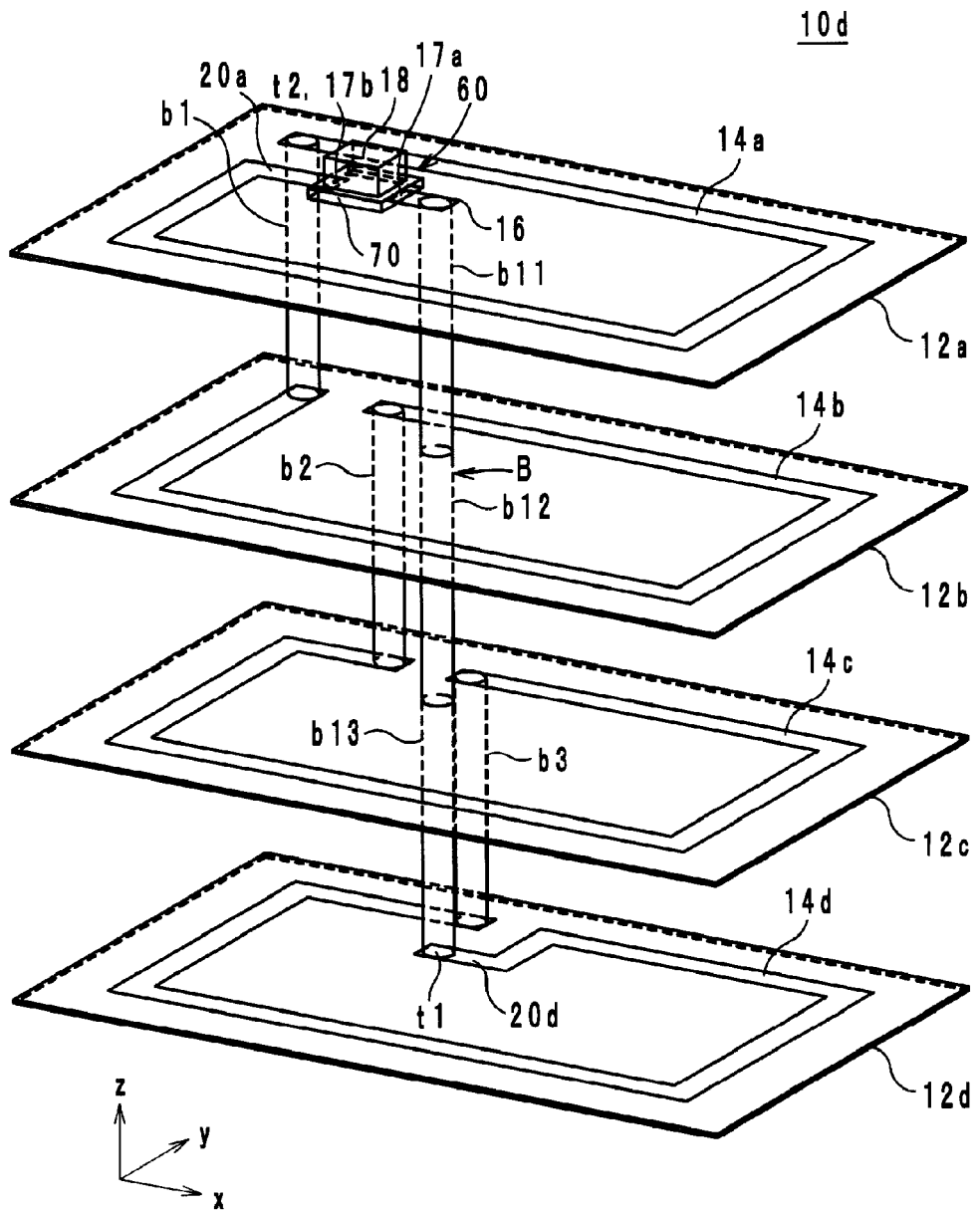
FIG. 8 is an exploded perspective view of a wireless IC device according to a fourth preferred embodiment of the present invention.
Figure 9:
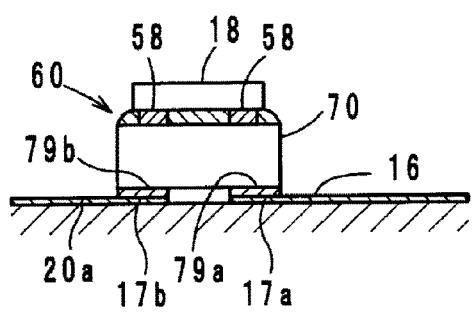
FIG. 9 is a sectional view of the vicinity of an electromagnetic coupling module of the wireless IC device illustrated in FIG. 8 in the xz-plane.

Hereafter, a wireless IC device according to a fourth preferred embodiment of the present invention will be described with reference to the drawings. FIG. 8 is an exploded perspective view of a wireless IC device 10d according to the fourth preferred embodiment. In FIG. 8, the x-axis extends in the direction of the long edges of the wireless IC device 10d, the y-axis extends in the direction of the short edges of the wireless IC device 10d, and the z-axis extends in a direction in which layers of the wireless IC device 10d are stacked. FIG. 9 is a sectional view of the vicinity of an electromagnetic coupling module 60 of the wireless IC device 10d in the xz-plane. In addition, in FIGS. 8 and 9, features and elements that are the same as those in FIGS. 1 and 2A are denoted by the same reference symbols.

In the wireless IC device 10d, as illustrated in FIG. 8, the wireless IC 18 is preferably electrically connected to the land conductors 17a and 17b of the connectors 16 and 20a through a feeder circuit board 70, in contrast to the wireless IC device 10a in which the wireless IC 18 is directly connected to the land conductors 17a and 17b of the connectors 16 and 20a. In the wireless IC device 10d, the wireless IC 18 and the feeder circuit board 70 define the electromagnetic coupling module 60.

In more detail, connection electrodes 58 are preferably provided on the lower surface of the wireless IC 18, as illustrated in FIG. 9. The wireless IC 18 is mounted on the feeder circuit board 70 via the connection electrodes 58. The feeder circuit board 70 includes an inductance element, which is connected to the wireless IC 18, and includes external electrodes 79a and 79b on the lower surface thereof. The external electrodes 79a and 79b are respectively connected to the land conductors 17a and 17b of the connectors 16 and 20a.

Figure 10:
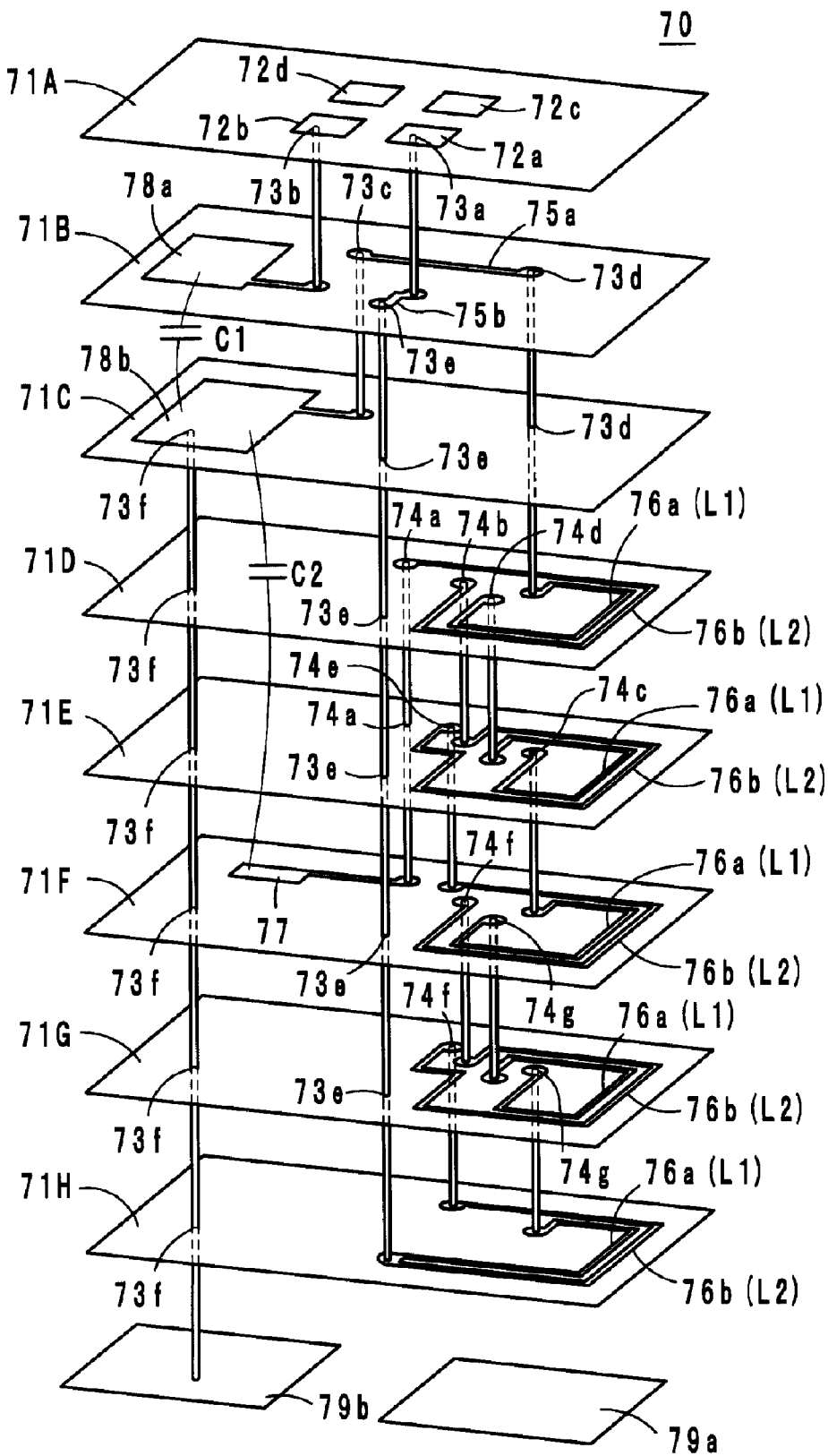
FIG. 10 is an exploded perspective view of a feeder circuit board.

Next, the feeder circuit board 70 will be described in detail with reference to FIG. 10. FIG. 10 is an exploded perspective view of the feeder circuit board 70.

The feeder circuit board 70 is preferably formed by stacking, pressure bonding, and baking ceramic sheets 71A to 71H made of a dielectric material. Connection electrodes 72a and 72b, electrodes 72c and 72d, and via hole conductors 73a and 73b are formed on and through the sheet 71A, a capacitor electrode 78a, conductor patterns 75a and 75b, and via hole conductors 73c to 73e are formed on and through the ceramic sheet 71B, and a capacitor electrode 78b and via hole conductors 73d to 73f are formed on and through the ceramic sheet 71C. Furthermore, conductor patterns 76a and 76b and via hole conductors 73e, 73f, 74a, 74b and 74d are formed on and through the ceramic sheet 71D; conductor patterns 76a and 76b and via holes conductors 73e, 73f, 74a, 74c and 74e are formed on and through the ceramic sheet 71E; a capacitor electrode 77, conductor patterns 76a and 76b and via hole conductors 73e, 73f, 74f and 74g are formed on and through the ceramic sheet 71F; conductor patterns 76a and 76b and via hole conductors 73e, 73f, 74f and 74g are formed on and through the ceramic sheet 71G; and conductor patterns 76a and 76b and a via hole conductor 73f are formed on and through the ceramic sheet 71H.

The ceramic sheets 71A to 71H are stacked on top of one another and thereby an inductance element L1 is defined by the conductor patterns 76a connected preferably in a helical shape, for example, by the via hole conductors 74c, 74d and 74g, an inductance element L2 is defined by the conductor patterns 76b connected in a helical shape by the via hole conductors 74b, 74e and 74f, a capacitance element C1 is defined by the capacitor electrodes 78a and 78b, and a capacitance element C2 is defined by the capacitor electrodes 78b and 77.

One end of the inductance element L1 is connected to the capacitor electrode 78b by the via hole conductor 73d, the conductor pattern 75a and the via hole conductor 73c, and one end of the inductance element L2 is connected to the capacitor electrode 77 by the via hole conductor 74a. Furthermore, the other end of the inductance element L1 and the other end of the inductance element L2 are integrated with each other on the ceramic sheet 71H and are connected to the connection electrode 72a by the via hole conductor 73e, the conductor pattern 75b and the via hole conductor 73a. Furthermore, the capacitor electrode 78a is electrically connected to the connection electrode 72b by the via hole conductor 73b.

In addition, the connection electrodes 72a to 72d are connected to the wireless IC 18 through the connection electrodes 58.

Furthermore, the external electrodes 79a and 79b are provided on the lower surface of the feeder circuit board 70 by coating conductor paste or other suitable material, for example, the external electrode 79a is coupled with the inductance elements L1 and L2 via a magnetic field, and the external electrode 79b is electrically connected to the capacitor electrode 78b by the via hole conductor 73f.

In addition, in this resonance circuit, the inductance elements L1 and L2 are configured such that the two conductor patterns 76a and 76b are arranged so as to be parallel or substantially parallel to each other. The two conductor patterns 76a and 76b have different line lengths and can have different resonant frequencies, and the frequency band of the wireless IC device can be increased.

Furthermore, each of the ceramic sheets 71A to 71H may preferably be a sheet made of a magnetic ceramic material and the feeder circuit board 70 can be more easily produced using a process of manufacturing a multilayer board, such as a sheet lamination method or a thick film printing method used in the background art, for example.

In addition, the ceramic sheets 71A to 71H, for example, may preferably be flexible sheets made of a dielectric, such as polyimide or a liquid-crystal polymer, for example, electrodes and conductors may preferably be formed on the sheets by a thick film forming method or other suitable method, for example, these sheets may be made into a laminate by stacking the sheets on top of one another and subjecting them to thermocompression bonding or other suitable bonding, and the inductance elements L1 and L2 and the capacitance elements C1 and C2 may be built into the laminate.

In the feeder circuit board 70, the inductance elements L1 and L2 and the capacitance elements C1 and C2 are preferably provided at different locations when viewed in plan, and the external electrode 79b is one of the electrodes included in the capacitance element C1 and is magnetically coupled to the external electrode 79a by the inductance elements L1 and L2.

Therefore, the electromagnetic coupling module 60 in which the wireless IC 18 is mounted on the feeder circuit board receives high-frequency signals through the antenna coil L from a reader/writer, which is not illustrated, causes the resonance circuit magnetically coupled with the external electrodes 79a and 79b through the antenna coil L to resonate, and supplies only received signals of a predetermined frequency band to the wireless IC 18. However, a predetermined amount of energy is extracted from a received signal and this energy is used as a driving source. After matching a predetermined frequency in the resonance circuit, a signal of information stored in the wireless IC 18 is transmitted to the reader/writer through the external electrodes 79a and 79b and the antenna coil L.

In the feeder circuit board 70, resonant frequency characteristics in the resonance circuit defined by the inductance elements L1 and L2 and the capacitance elements C1 and C2 are determined. The frequency of a signal from the antenna coil L is substantially determined by the self-resonance frequency of the resonance circuit.

In addition, other structures of the wireless IC device 10d are substantially the same as those of the wireless IC device 10a and therefore description thereof will be omitted. Furthermore, the feeder circuit board 70 can also be used in any of the wireless IC devices 10a, 10bm and 10c.

Similar to the wireless IC device 10a, variations of the resonant frequency during use are reduced with in wireless IC device 10d.

Fifth Preferred Embodiment

Figure 11:
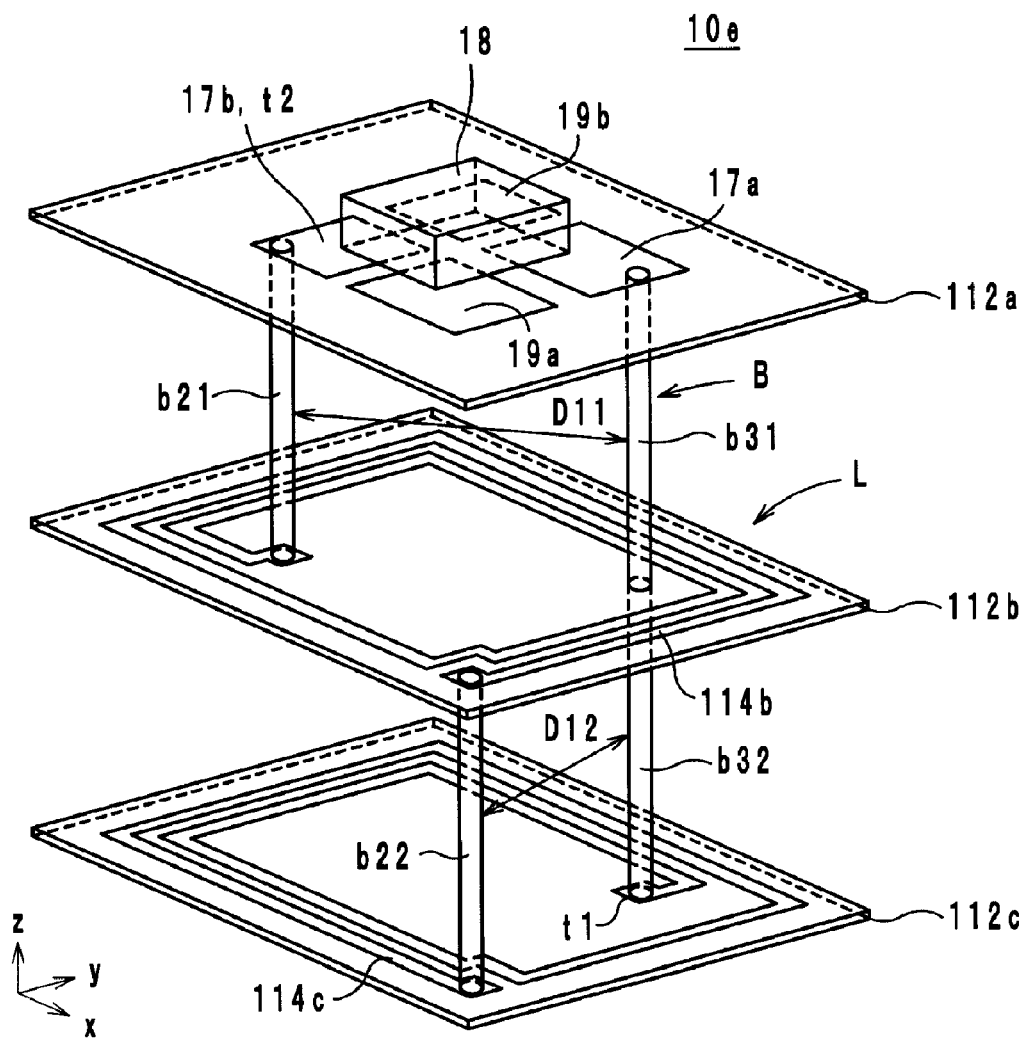
FIG. 11 is an exploded perspective view of a wireless IC device according to a fifth preferred embodiment of the present invention.

A wireless IC device according to a fifth preferred embodiment of the present invention will be described with reference to the drawings. FIG. 11 is an exploded perspective view of a wireless IC device 10e according to the fifth preferred embodiment. In FIG. 11, the x-axis extends in the direction of the long edges of the wireless IC device 10e, the y-axis extends in the direction of the short edges of the wireless IC device 10e, and the z-axis extends in a direction in which layers of the wireless IC device 10e are stacked.

A first difference between the wireless IC device 10a and the wireless IC device 10e is that, whereas the coil conductors 14a to 14d extend through a length of less than one circuit around the coil axis of the antenna coil L in the wireless IC device 10a, coil conductors 114b and 114c extend through a length of 7/4 a circuit around the coil axis of the antenna coil L in the wireless IC device 10e. Furthermore, a second difference between the wireless IC device 10a and the wireless IC device 10e is that, whereas the coil conductor 14a is provided on the insulator layer 12a on the uppermost side in the z-axis direction in the wireless IC device 10a, a coil conductor 114 is not provided on an insulator layer 112a provided on the uppermost side in the z-axis direction in the wireless IC device 10e. Hereafter, the wireless IC device 10e will be described in detail.

The wireless IC device 10e includes insulator layers 112a to 112c, land conductors 17a, 17b, 19a and 19b, a wireless IC 18, an antenna coil L, and via hole conductors b31 and b32, as illustrated in FIG. 11. In addition, the antenna coil L preferably has a helical shape that spirals and extends in the z-axis direction as a result of a land conductor 17b, the coil conductors (conductor layers) 114b and 114c, and the via hole conductors b21 and b22 being connected to one another. Hereafter, when indicating specific structural elements, alphabetic and/or numerical characters are affixed after the reference symbols, whereas when referring to the structural elements in general, the alphabetical and/or numerical characters affixed after the reference symbols are omitted.

The insulator layers 112 are sheets that preferably have a rectangular shape and are made of an insulating material, and are preferably, for example, manufactured using liquid crystal polymer (LCP) or polyethylene terephthalate (PET) resin sheets.

The land conductors 17a, 17b, 19a and 19b are preferably formed on the insulator layer 112a using a metal foil, such as copper foil or aluminum foil, for example. The land conductor 17b defines an end portion t2 of the antenna coil L. In addition, the land conductors 19a and 19b are dummy conductors that are not electrically connected to the antenna coil L.

The coil conductors 114b and 114c are preferably respectively formed on the insulator layers 112b and 112c of a metal foil, such as copper foil or aluminum foil, for example, so as to have the same or substantially the same line width. The coil conductors 114 extend through a length of 7/4 of a circuit around the coil axis of the antenna coil L. In addition, as illustrated in FIG. 11, the coil conductors 114b and 114c are superposed with one another when viewed in plan from the z-axis direction.

The via hole conductor b21 is a connection conductor arranged to penetrate through the insulator layer 112a and connects the land conductor 17b and the coil conductor 114b to each other. The via hole conductor b22 is a connection conductor arranged to penetrate through the insulator layer 112b and connects the coil conductor 114b and the coil conductor 114c to each other.

The wireless IC 18 is electrically connected to the land conductors 17a and 17b and is an integrated circuit arranged to process transmission and reception signals exchanged with a reader/writer. The wireless IC 18 is directly mounted on the land conductors 17a, 17b, 19a and 19b with solder or other suitable material. When the wireless IC device 10e is used as a commuter pass, the wireless IC 18 preferably stores information regarding the zones in which the commuter pass can be used, information regarding the owner of the commuter pass, and other applicable information. Such information may preferably be rewritable and an information processing function other than that of the RFID system including the reader/writer and the wireless IC device 10e may be provided.

The via hole conductors b31 and b32 preferably define a single via hole conductor (penetrating via hole conductor) B and are provided between an end portion t1 and the wireless IC 18. Specifically, the via hole conductors b31 and b32 are connection conductors arranged so as to respectively penetrate through the insulator layers 112a and 112b and connect the land conductor 17a and the end portion t1 of the coil conductor 114c to each other. Therefore, the via hole conductors b31 and b32 connect the land conductor 17a, which is a conductor layer arranged on the uppermost side in the z-axis direction, and the coil conductor 114c, which is a conductor layer arranged on the lowermost side in the z-axis direction, to each other.

The wireless IC device 10e is formed by stacking the plurality of insulator layers 112a to 112c illustrated in FIG. 11 on top of one another.

The wireless IC device 10e is configured to prevent deviations of the resonant frequency from the desired value, similar to the wireless IC device 10a. Specifically, in the wireless IC device 10e, the current path lengths from the end portion t2 to the via hole conductors b21 and b22 in the antenna coil L preferably increase in this order. Then, a distance D11 between the via hole conductor B and the via hole conductor b21 is greater than a distance D12 between the via hole conductor B and the via hole conductor b22 when viewed in plan from the z-axis direction as illustrated in FIG. 11.

With the above-described wireless IC device 10e, deviations of the resonant frequency from the desired value are effectively prevented, as in the wireless IC device 10a.

Furthermore, whereas the coil conductors 14 of the wireless IC device 10a extend through a length of approximately one circuit around the coil axis of the antenna coil L, the coil conductors 114 of the wireless IC device 10e extend through a length of about 7/4 of a circuit around the coil axis of the antenna coil L. Therefore, with the wireless IC device 10e, the same or substantially the same inductance value can be obtained with fewer coil conductors 114 than in the wireless IC device 10a. As a result, the thickness of the wireless IC device 10e in the z-axis direction can be reduced as compared to the wireless IC device 10a.

Sixth Preferred Embodiment

Figure 12:
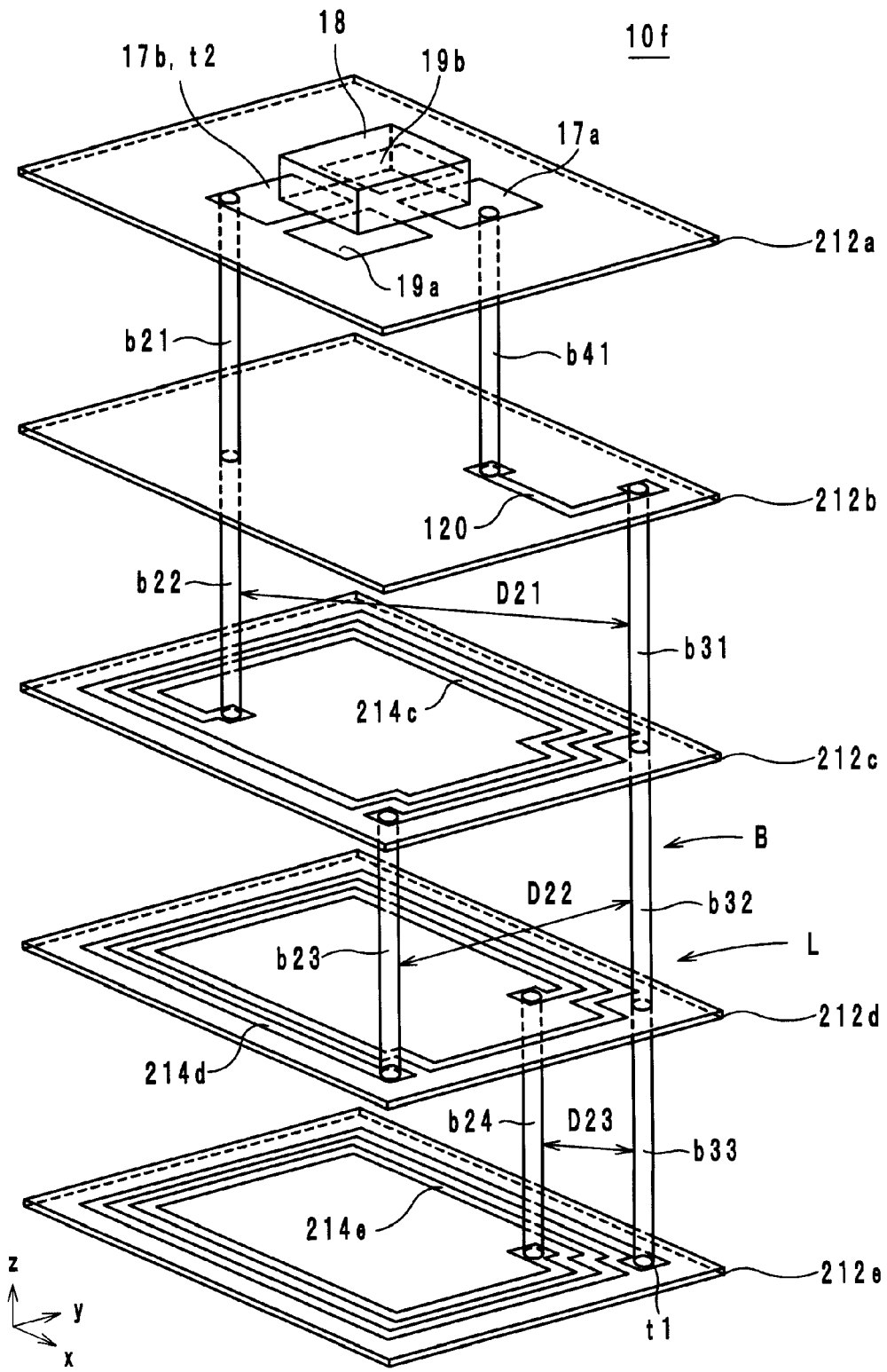
FIG. 12 is an exploded perspective view of a wireless IC device according to a sixth preferred embodiment of the present invention.

A wireless IC device according to a sixth preferred embodiment of the present invention will be described with reference to the drawings. FIG. 12 is an exploded perspective view of a wireless IC device 10f according to the sixth preferred embodiment. In FIG. 12, the x-axis extends in the direction of the long edges of the wireless IC device 10f, the y-axis extends in the direction of the short edges of the wireless IC device 10f, and the z-axis extends in a direction in which layers of the wireless IC device 10f are stacked.

A first difference between the wireless IC device 10e and the wireless IC device 10f is that, whereas in the wireless IC device 10e, the via hole conductor B extends in the z-axis direction inside the antenna coil L, in the wireless IC device 10f, the via hole conductor B extends in the z-axis direction outside the antenna coil L. A second difference between the wireless IC device 10e and the wireless IC device 10f is that, whereas in the wireless IC device 10e the via hole conductor B is directly connected to the land conductor 17a, in the wireless IC device 10f the via hole conductor B is not directly connected to the land conductor 17a.

As illustrated in FIG. 12, the wireless IC device 10f includes insulator layers 212a to 212e, land conductors 17a, 17b, 19a and 19b, a wireless IC 18, a connector 120, an antenna coil L, and via hole conductors b31 to b33 and b41. Furthermore, the antenna coil L preferably has a helical shape that spirals and extends in the z-axis direction as a result of the land conductor 17b, the coil conductors (conductor layers) 214c to 214e and the via hole conductors b21 to b24 being connected to one another. Hereafter, when indicating specific structural elements, alphabetic and/or numerical characters are affixed after the reference symbols, whereas when referring to the structural elements in general, the alphabetical and/or numerical characters affixed after the reference symbols are omitted.

The insulator layers 212 are sheets that preferably have a rectangular shape and are composed of an insulating material, and are preferably, for example, manufactured using liquid crystal polymer (LCP) or polyethylene terephthalate (PET) resin sheets.

The land conductors 17a, 17b, 19a and 19b are preferably formed on the insulator layer 212a of a metal foil, such as copper foil or aluminum foil, for example. The land conductor 17b defines an end portion t2 of the antenna coil L. In addition, the land conductors 19a and 19b are dummy conductors that are not electrically connected to the antenna coil L.

The coil conductors 214c to 214e are preferably respectively formed on the insulator layers 212c to 212e of a metal foil, such as copper foil or aluminum foil, for example, so as to have the same or substantially the same line width. The coil conductors 214c and 214d extend through a length of about 7/4 of a circuit around the coil axis of the antenna coil L. Furthermore, the coil conductor 214e winds through a length of about two circuits around the coil axis of the antenna coil L. In addition, as illustrated in FIG. 12, the coil conductors 214c to 214e are superposed with one another when viewed in plan from the z-axis direction. Furthermore, one end of the coil conductor 214e defines an end portion t1 of the antenna coil L.

The via hole conductors b21 and b22 are connection conductors arranged to respectively penetrate through the insulator layers 212a and 212b and connect the land conductor 17b and the coil conductor 214c to each other. The via hole conductor b23 is a connection conductor arranged to penetrate through the insulator layer 212c and connect the coil conductor 214c and the coil conductor 214d to each other. The via hole conductor b24 is a connection conductor arranged to penetrate through the insulator layer 212d and connect the coil conductor 214d and the coil conductor 214e to each other.

The wireless IC 18 is electrically connected to the land conductors 17a and 17b and is an integrated circuit arranged to process transmission and reception signals exchanged with a reader/writer. The wireless IC 18 is directly mounted on the land conductors 17a, 17b, 19a and 19b with solder or other suitable material. When the wireless IC device 10f is used as a commuter pass, the wireless IC 18 preferably stores information regarding the zones in which the commuter pass can be used, information regarding the owner of the commuter pass, and other applicable information. Such information may be rewritable and an information processing function other than that of the RFID system including the reader/writer and the wireless IC device 10f may preferably be included.

The connector 120 is preferably a line-shaped connector that is formed on the insulator layer 212b of a metal foil, such as copper foil or aluminum foil, for example. One end of the connector 120 is superposed with the land conductor 17a when viewed in plan from the z-axis direction. The other end of the connector 120 is superposed with the coil conductor 214e when viewed in plan from the z-axis direction.

The via hole conductors b31 to b33 define a single via hole conductor (penetrating via hole conductor) B and are arranged between the end portion t1 and the wireless IC 18. Specifically, the via hole conductors b31 to b33 are connection conductors arranged to respectively penetrate through the insulator layers 212b to 212d and connect the other end of the connector 120 and the end portion t1 of the coil conductor 214e to each other.

The via hole conductor b41 is a connection conductor arranged to penetrate through the insulator layer 212a and connect the land conductor 17a and the one end of the connector 120 to each other.

The wireless IC device 10f is formed by stacking the plurality of insulator layers 212a to 212e illustrated in FIG. 12 on top of one another.

The wireless IC device 10f is configured so as to prevent deviations of the resonant frequency from the desired value, similar to the wireless IC device 10a. Specifically, in the wireless IC device 10f, the current path lengths from the end portion t2 to the via hole conductors b21, b22, b23 and b24 in the antenna coil L increase in this order. Then, a distance D21 between the via hole conductor B and the via hole conductors b21 and b22 is greater than distances D22 and D23 between the via hole conductor B and the via hole conductors b23 and b24 when viewed in plan from the z-axis direction as illustrated in FIG. 12.

With the above-described wireless IC device 10f, deviations of the resonant frequency from the desired value are effectively prevented, as in the wireless IC device 10a.

Wireless IC devices according to preferred embodiments of the present invention are not limited to the above-described wireless IC devices 10a to 10f according to the first to sixth preferred embodiments of the present invention and can be modified within the scope of the gist of the present invention.

Furthermore, the phrase "the coil conductor 14 has a length less than about one circuit" means that the coil conductor 14 has a length that is approximately less than one circuit. Therefore, the length of the coil conductor 14 may slightly exceed one circuit as long as the resonant frequency of the wireless IC device 10 does not vary during use.

In addition, in the wireless IC devices 10a to 10f, the coil conductors 14, 24, 34, 114 and 214 are preferably arranged so as to be superposed with one another in the line-width direction when viewed in plan from the z-axis direction. However, the coil conductors 14, 24, 34, 114 and 214 on the lower side in the z-axis direction may slightly extend outward with respect to the coil conductors 14, 24, 34, 114 and 214 on the upper side in the z-axis direction when viewed in plan from the z-axis direction. However, it is preferable that the coil conductors 14, 24, 34, 114 and 214 only extend outward by an amount that does not affect the resonant frequency.

Figure 13:
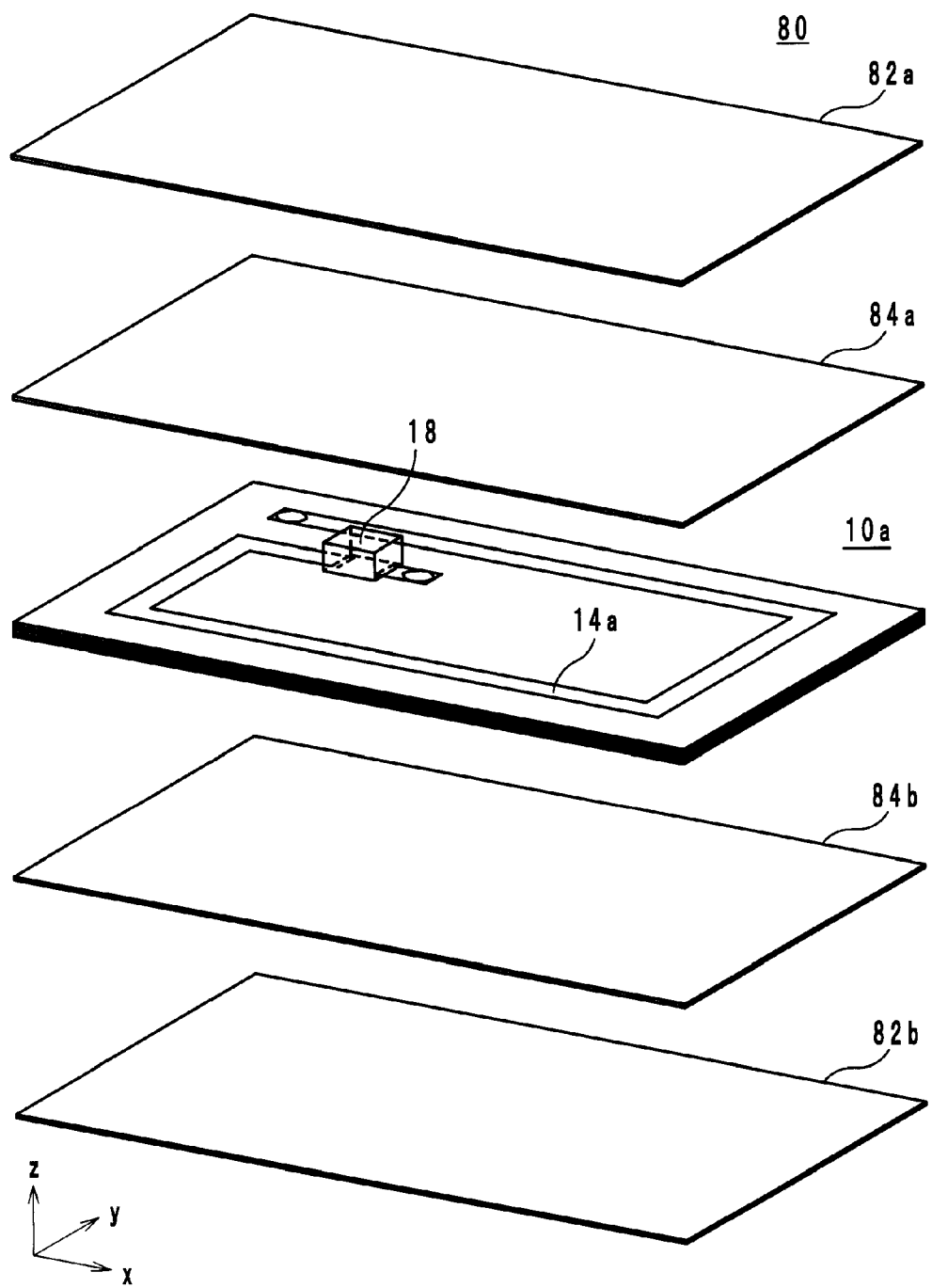
FIG. 13 is an exploded perspective view of a wireless IC card.

A method of manufacturing a wireless IC device according to another preferred embodiment of the present invention will be described with reference to the drawings. Hereafter, a method of manufacturing the wireless IC device 10a, as an example of a wireless IC device according to this preferred embodiment of the present invention, will be described. In addition, a method of manufacturing a wireless IC card 80, to which the wireless IC device 10a is applied, will be described. FIG. 13 is an exploded perspective view of the wireless IC card 80.

The insulator layers 12 preferably made of, for example, a glass epoxy substrate, polyimide, polyvinyl chloride, polyethylene terephthalate (PET), PET-G or a liquid crystal polymer resin are prepared. The coil conductors 14 illustrated in FIG. 1 are formed on the respective insulator layers 12. When the coil conductors 14 are composed of copper foil, the coil conductors 14 are preferably formed using, for example, an etching process.

Furthermore, simultaneously with forming the coil conductors 14, the connectors 16, 20a, and 20d are also preferably formed using, for example, an etching process. On the insulator layer 12a, the connector 20a, which is connected to the coil conductor 14a, is formed and the connector 16 is formed at a location spaced apart from the connector 20a by an area in which the wireless IC 18 is to be mounted. Furthermore, the connector 20d is formed on the insulator layer 12d so as to be superposed with the connector 16 when viewed in plan from the z-axis direction and so as to be connected to the coil conductor 14d.

In addition, the coil conductors 14a to 14d and the connectors 16, 20a and 20d can also be formed using a screen printing method in which a conductive paste is applied, for example.

Next, via holes are formed at locations at which the via hole conductors b1 to b3 and b11 to b13 of the insulator layers 12a to 12c are to be formed preferably by radiating a laser beam from the back surface side, for example. Thereafter, a conductive paste preferably having copper as a main constituent, for example, is filled into the via holes formed in the insulator layers 12a to 12c, thereby forming the via hole conductors b1 to b3 and b11 to b13 illustrated in FIG. 1.

Next, the plurality of insulator layers 12a to 12d are aligned and stacked on top of one another such that the plurality of coil conductors 14a to 14d are superposed with one another and thereby form a single ring when viewed in plan from the z-axis direction. At this time, the connectors 16 and 20d are also superposed with each other when viewed in plan from the z-axis direction. Once stacking of the insulator layers 12a to 12d is complete, the insulator layers 12a to 12d are heated and pressure bonded.

Next, the wireless IC 18 is mounted on the connectors and 20a of the insulator layer 12a. Specifically, the wireless IC 18 is preferably mounted by performing a flip chip mounting process, for example, in which an anisotropic conductive film (ACF) is used. At this time, after the wireless IC 18 has been aligned and temporarily affixed so as to be connected to the connectors 16 and 20a, hot pressing is performed so that the wireless IC 18 is permanently attached. By performing the above process, the wireless IC device 10a is produced.

Once the wireless IC device 10a has been completed, as illustrated in FIG. 13, the wireless IC card 80 is manufactured by attaching overlay sheets 82a and 82b via adhesive sheets 84a and 84b. In more detail, the adhesive sheet 84a and the overlay sheet 82a are stacked on the upper side of the wireless IC device 10a in the z-axis direction and the adhesive sheet 84b and the overlay sheet 82b are stacked on the lower side of the wireless IC device 10a. Then, heating and pressure bonding are performed. Thus, the wireless IC card 80 is produced.

In addition, in the method of manufacturing a wireless IC device, a method of manufacturing the wireless IC device 10a was described. However, the wireless IC devices 10b to 10f can also be manufactured using substantially the same manufacturing method.

In addition, when manufacturing the wireless IC device 10d, the electromagnetic coupling module 60, which includes of the wireless IC 18 and the feeder circuit board 70, is mounted instead of the wireless IC 18.

Preferred embodiments of the present invention may preferably be used in wireless IC devices and are particularly advantageous because deviations of the resonant frequency from the desired value are prevented.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:
1. A wireless IC device comprising:
   a laminate including a plurality of insulator layers stacked on top of one another;
   an antenna coil having a helical shape and including a plurality of conductor layers and a plurality of via hole conductors being connected to one another, a first end portion arranged in a lowermost conductor layer of the plurality of conductor layers in a direction in which the layers are stacked, and a second end portion arranged in an uppermost conductor layer of the plurality of conductor layers in the direction in which the layers are stacked;
   a wireless IC electrically connected to the first end portion and the second end portion; and
   a penetrating via hole conductor arranged between the first end portion and the wireless IC and penetrating through the plurality of insulator layers; wherein
   the plurality of via hole conductors includes a first via hole conductor arranged such that a length of a current path thereto from the second end portion is the shortest among the plurality of via hole conductors in the antenna coil and a second via hole conductor; and a distance between the penetrating via hole conductor and the first via hole conductor is greater than a distance between the penetrating via hole conductor and the second via hole conductor when viewed in plan from the direction in which the layers are stacked.

2. The wireless IC device according to claim 1, wherein the penetrating via hole conductor is arranged to be closer to the wireless IC than the plurality of via hole conductors when viewed in plan from the direction in which the layers are stacked.

3. The wireless IC device according to claim 1, wherein the plurality of conductor layers are superposed on one another when viewed in plan from the direction in which the layers are stacked.

4. The wireless IC device according to claim 1, wherein the plurality of conductor layers are superposed on one another when viewed in plan from the direction in which the layers are stacked and define a single ring-shaped path.

5. The wireless IC device according to claim 4, wherein the conductor layer provided on the lowermost side in the direction in which the layers are stacked winds through a length of less than one circuit around the coil axis of the antenna coil.

6. The wireless IC device according to claim 1, wherein the penetrating via hole conductor connects the conductor layer provided on the uppermost side in the direction in which the layers are stacked and the conductor layer provided on the lowermost side in the direction in which the layers are stacked.

7. The wireless IC device according to claim 1, wherein the second end portion includes a first land electrode on which the wireless IC is mounted.

8. The wireless IC device according to claim 1, further comprising a second land electrode on which the wireless IC is mounted and that is electrically connected to the penetrating via hole conductor.

* * * * *